(12) United States Patent
Woo et al.

(10) Patent No.: US 12,040,547 B2
(45) Date of Patent: Jul. 16, 2024

(54) ELECTRONIC DEVICE WITH ANTENNA

(71) Applicant: LG ELECTRONICS INC., Seoul (KR)

(72) Inventors: Seungmin Woo, Seoul (KR); Dongik Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 85 days.

(21) Appl. No.: 17/918,086

(22) PCT Filed: Apr. 10, 2020

(86) PCT No.: PCT/KR2020/004884
§ 371 (c)(1),
(2) Date: Oct. 10, 2022

(87) PCT Pub. No.: WO2021/206199
PCT Pub. Date: Oct. 14, 2021

(65) Prior Publication Data
US 2023/0139460 A1    May 4, 2023

(51) Int. Cl.
*H01Q 21/06* (2006.01)
*H01Q 1/38* (2006.01)
(Continued)

(52) U.S. Cl.
CPC .............. *H01Q 21/06* (2013.01); *H01Q 1/38* (2013.01); *H01Q 3/30* (2013.01); *H01Q 9/40* (2013.01); *H04B 7/0413* (2013.01)

(58) Field of Classification Search
CPC ............ H01Q 21/06; H01Q 1/38; H01Q 3/30; H01Q 9/40; H01Q 1/243; H01Q 9/30;
(Continued)

(56) References Cited

U.S. PATENT DOCUMENTS

2013/0088396 A1*  4/2013  Han ..................... H01Q 9/04
                                                     343/700 MS
2015/0124306 A1    5/2015  Bartoli et al.
(Continued)

FOREIGN PATENT DOCUMENTS

JP       2018514981       6/2018
JP       2018515044       6/2018
(Continued)

OTHER PUBLICATIONS

PCT International Application No. PCT/KR2020/004884, International Search Report dated Jan. 8, 2021, 5 pages.
(Continued)

*Primary Examiner* — David E Lotter
(74) *Attorney, Agent, or Firm* — LEE, HONG, DEGERMAN, KANG & WAIMEY

(57) ABSTRACT

An electronic device having an antenna according to an embodiment is provided. The electronic device may include a radiator configured by stacking metal patterns on different layers of a multi-layer substrate, and a ground layer arranged on the different layers of the multi-layer substrate and operating as ground for the radiator. At least some of the metal patterns may be vertically interconnected, and any one of the metal patterns may be connected to a feeding pattern.

16 Claims, 24 Drawing Sheets

(51) Int. Cl.
  *H01Q 3/30* (2006.01)
  *H01Q 9/40* (2006.01)
  *H04B 7/0413* (2017.01)

(58) Field of Classification Search
  CPC .... H01Q 19/26; H01Q 21/062; H01Q 21/065; H01Q 21/08; H01Q 21/24; H01Q 21/28; H01Q 3/26; H04B 7/0413; H04B 7/10; H04B 7/0617
  See application file for complete search history.

(56) References Cited

U.S. PATENT DOCUMENTS

| | | | |
|---|---|---|---|
| 2018/0145420 A1* | 5/2018 | Kushta | H01Q 1/523 |
| 2019/0334233 A1 | 10/2019 | Kim et al. | |
| 2020/0203851 A1* | 6/2020 | Takaki | H01Q 9/42 |

FOREIGN PATENT DOCUMENTS

| | | |
|---|---|---|
| KR | 20130037083 | 4/2013 |
| WO | 2019026913 | 2/2019 |

OTHER PUBLICATIONS

Korean Intellectual Property Office Application No. 10-2022-7028642, Notice of Allowance dated Nov. 2, 2023, 6 pages.

* cited by examiner

ELECTRONIC DEVICE WITH ANTENNA

CROSS-REFERENCE TO RELATED APPLICATIONS

This application is the National Stage filing under 35 U.S.C. 371 of International Application No. PCT/KR2020/004884, filed on Apr. 10, 2020, the contents of which are all incorporated by reference herein in their entirety.

TECHNICAL FIELD

The present disclosure relates to an electronic device having antennas. One particular implementation relates to an antenna module having an array antenna that operates in a millimeter wave band.

BACKGROUND ART

Electronic devices may be classified into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the mobile terminal may be configured to provide 5G communication services in various frequency bands. Recently, attempts have been made to provide 5G communication services using a Sub-6 band under a 6 GHz band. In the future, it is also expected to provide 5G communication services by using a millimeter-wave (mm-Wave) band in addition to the Sub-6 band for a faster data rate.

Meanwhile, a 28 GHz band, a 38.5 GHz band, and a 64 GHz band are being considered as frequency bands to be allocated for 5G communication services in such mmWave bands. In this regard, a plurality of array antennas may be disposed in an electronic device in the mmWave bands.

In this regard, an array antenna capable of operating in a mmWave band may be mounted in an antenna module. An antenna element disposed in the antenna module may radiate a certain polarization signal. Signal reception characteristics of an antenna element that radiates a particular polarization signal may deteriorate when an electronic device is moved or rotated.

When one antenna module processes only one polarization signal, an antenna module should be additionally provided for multiple-input multiple-output (MIMO). Particularly, a vertical polarization antenna may be difficult to be disposed in an antenna module having a certain height.

DISCLOSURE OF INVENTION

Technical Problem

The present disclosure is directed to solving the aforementioned problems and other drawbacks. The present disclosure is also directed to providing an antenna module in which an array antenna operating in a millimeter wave band is disposed, and an electronic device having a configuration for controlling the antenna module.

The present disclosure is also directed to providing an antenna module including antenna elements with different polarizations orthogonal to each other in a millimeter wave band.

The present disclosure is also directed to providing a vertical polarization antenna in an antenna module having a certain height.

The present disclosure is also directed to providing an antenna structure that may implement vertical polarization while lowering a height.

The present disclosure is also directed to providing an antenna structure for reducing a level of interference between antennas with different polarizations.

Solution to Problem

To achieve the above or other aspects, an electronic device with an antenna according to one embodiment is provided. The electronic device may include a radiator configured by stacking metal patterns on different layers of a multi-layer substrate; and a ground layer disposed on different layers of the multi-layer substrate and operating as a ground for the radiator, wherein at least some of the metal patterns are vertically connected to each other, and one of the metal patterns is connected to a feeding pattern.

In an embodiment, the radiator may operate as a monopole antenna due to a ground pattern located below the feeding pattern and the ground layer operating as a ground wall.

In an embodiment, the ground wall may include a plurality of via holes configured to connect different ground planes on different layers of the multi-layer substrate to each other. The plurality of via holes may be provided in an edge of the multi-layer substrate to be spaced apart from each other by a certain distance.

In an embodiment, an antenna module of the electronic device may include a first array antenna including a plurality of radiators spaced apart from each other by a certain distance in a width direction to perform beamforming. A slot region may be provided in a ground region between the plurality of radiators of the first array antenna.

In an embodiment, the antenna module of the electronic device may further include a second array antenna including a plurality of second radiators spaced apart from each other by a certain distance in a width direction to perform beamforming. The plurality of second radiators may be disposed in regions between the plurality of radiators corresponding to the slot region, respectively, and the plurality of radiators and the plurality of second radiators have polarization characteristics orthogonal to each other.

In an embodiment, the electronic device may further include a transceiver circuit operably coupled to one of the first array antenna and the second array antenna, and configured to control the first array antenna and the second array antenna.

In an embodiment, metal pattern at a lower end, among the metal patterns of the plurality of radiators, may be connected to the feeding pattern. A ground pattern may be disposed below the metal pattern at the lower end. An end of the ground pattern may extend in a longitudinal direction, compared to an end of the metal pattern at the lower end.

In an embodiment, the plurality of second radiators may be disposed in a form of a dipole antenna on one layer of the multi-layer substrate and connected to the transceiver circuit through a second feeding pattern.

In an embodiment, the plurality of radiators may include a feeding radiator configured by stacking metal patterns on different layers of the multi-layer substrate, and one of the metal patterns may be connected to the feeding pattern. The radiator may further include a director spaced apart from the feeding radiator by a certain distance in a longitudinal direction and configured by stacking metal patterns on different layers of the multi-layer substrate.

In an embodiment, the director may be configured by connecting the metal patterns to each other, and the metal patterns of the director may be also provided on a lowermost portion of the multi-layer substrate.

In an embodiment, the plurality of second radiators may include a feeding radiator disposed in a form of a dipole antenna on one layer of the multi-layer substrate. The plurality of second radiators may further include a director spaced apart from the feeding radiator by a certain distance in a longitudinal direction to be parallel with the feeding radiator.

In an embodiment, the radiator may include a plurality of metal patterns disposed on the different layers of the multi-layer substrate. The plurality of metal patterns may include a via pad disposed at a lower end of the radiator and a plurality of metal strips.

In an embodiment, metal strips on adjacent layers among the plurality of metal strips may be alternately connected to each other on different ends.

In an embodiment, the radiator may include a plurality of via pads disposed on each of different layers of the multi-layer substrate to be offset by a certain distance. Adjacent via pads among the plurality of via pads may be connected to each other through vias disposed to be offset by a certain distance, respectively.

In an embodiment, a metal pattern at a lower end, among the metal patterns, may be connected to a ground pattern, and a metal pattern arranged over the metal pattern at the lower end connected to the ground pattern may be connected to the feeding pattern.

In an embodiment, the electronic device may further include baseband processor operably coupled to the transceiver circuit and configured to control the transceiver circuit. The baseband processor may be configured to control the transceiver circuit to perform multiple-input multiple-output (MIMO) through the first array antenna and the second array antenna.

The baseband processor may be configured to control the transceiver circuit to radiate a vertical polarization signal through the first array antenna and radiate a horizontal polarization signal through the second array antenna.

Advantageous Effects of Invention

Technical effects of an array antenna that operates in a millimeter wave band and an electronic device for control of the same will be described below.

According to an embodiment, an electronic device including an antenna module having an array antenna operating in a millimeter wave band and a transceiver circuit and a modem both configured to control the antenna module may be provided.

According to an embodiment, an antenna module having antenna elements with different polarizations orthogonal to each other in a millimeter wave band may be provided by disposing a monopole antenna and a dipole antenna in the antenna module.

According to an embodiment, a vertical polarization antenna may be provided in an antenna monopole having a certain height through a monopole antenna implemented with a via pad and via.

According to an embodiment, an antenna structure configured to implement vertical polarization while reducing a height by offsetting a via pad and a via by a certain distance or through a combination of a metal strip and a via may be provided.

According to an embodiment, a level of interference between antennas with different polarizations may be reduced by alternately arranging a monopole antenna and a dipole antenna with different polarizations vertically and horizontally in an antenna module.

According to an embodiment, communication coverage in a millimeter wave band may be improved by increasing an end-fire antenna gain.

According to an embodiment, an end-fire antenna may be implemented as a double polarization array antenna to increase a number of multi-input multi-output (MIMO) streams, thereby improving communication capacity and reliability.

According to an embodiment, MIMO may be implemented using only one antenna module through antennas with polarizations orthogonal to each other.

Further scope of applicability of the present disclosure will become apparent from the following detailed description. It should be understood, however, that the detailed description and specific examples, such as the preferred embodiment of the present disclosure, are given by way of illustration only, since various changes and modifications within the spirit and scope of the present disclosure will be apparent to those skilled in the art.

MODE FOR THE INVENTION

Figure 1:
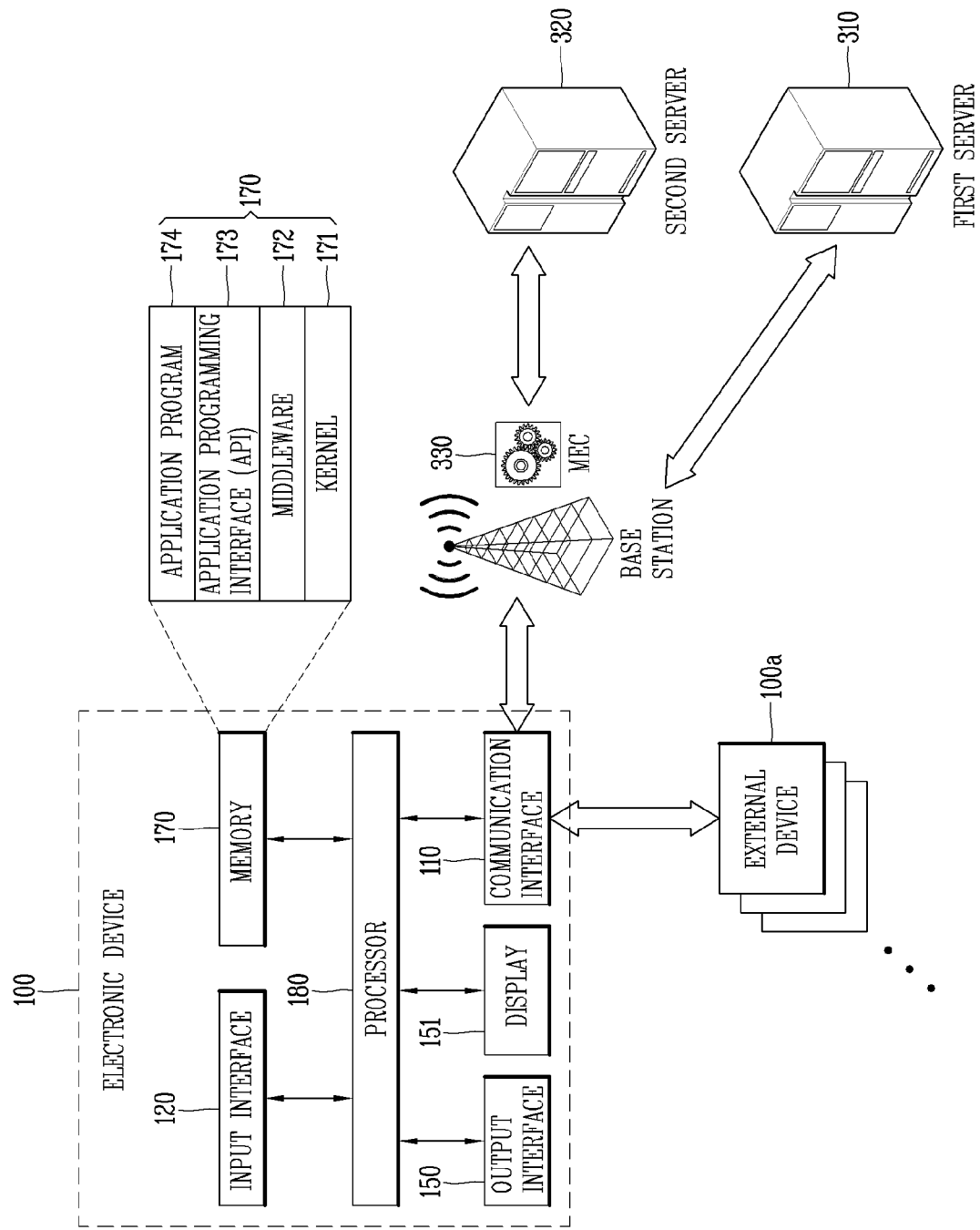
FIG. 1 is a view illustrating a configuration for describing an electronic device in accordance with one embodiment, and an interface between the electronic device and an external device or server.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

Figure 2A:
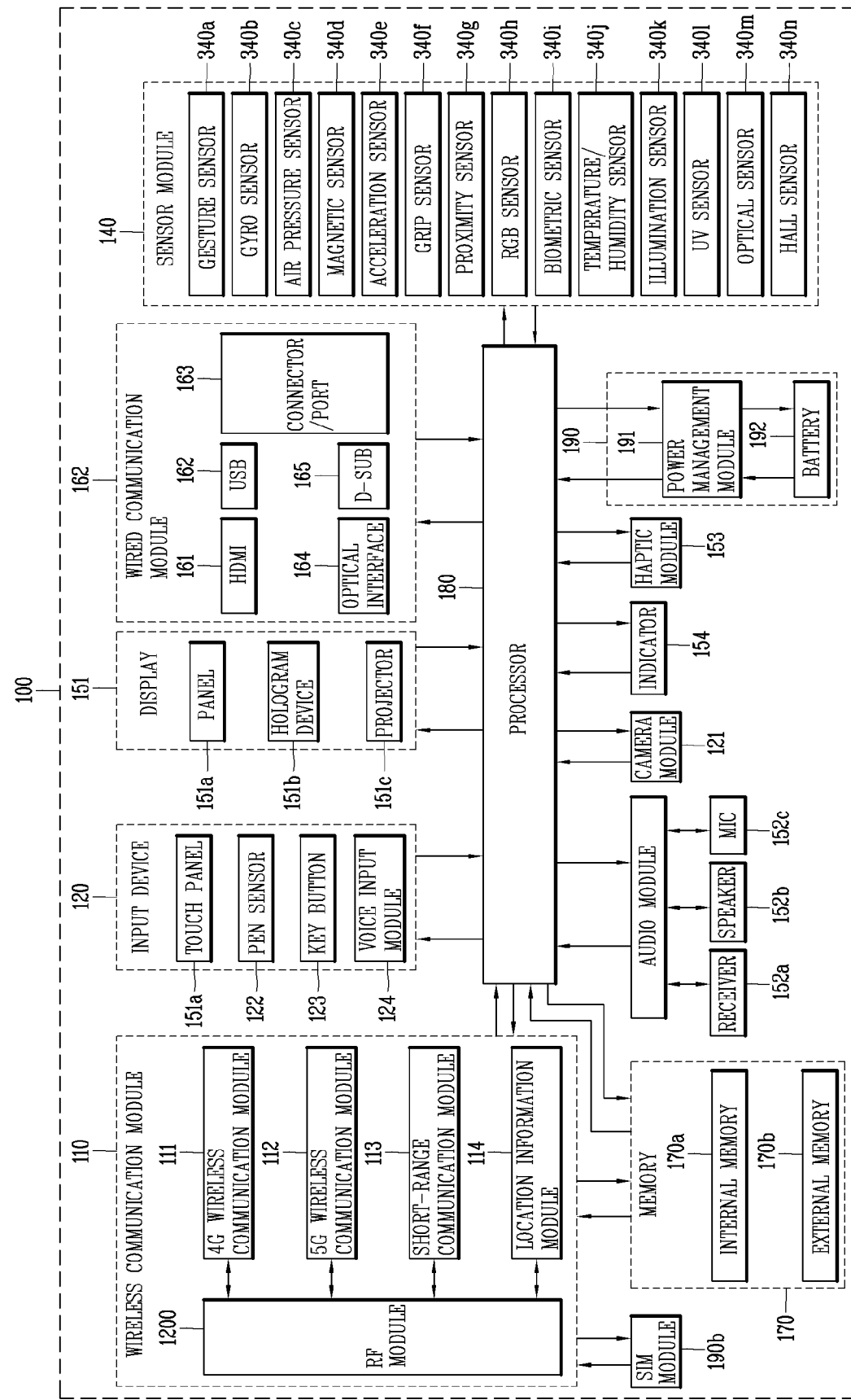
FIG. 2A is a view illustrating a detailed configuration of the electronic device of FIG. 1.
Figure 2B:
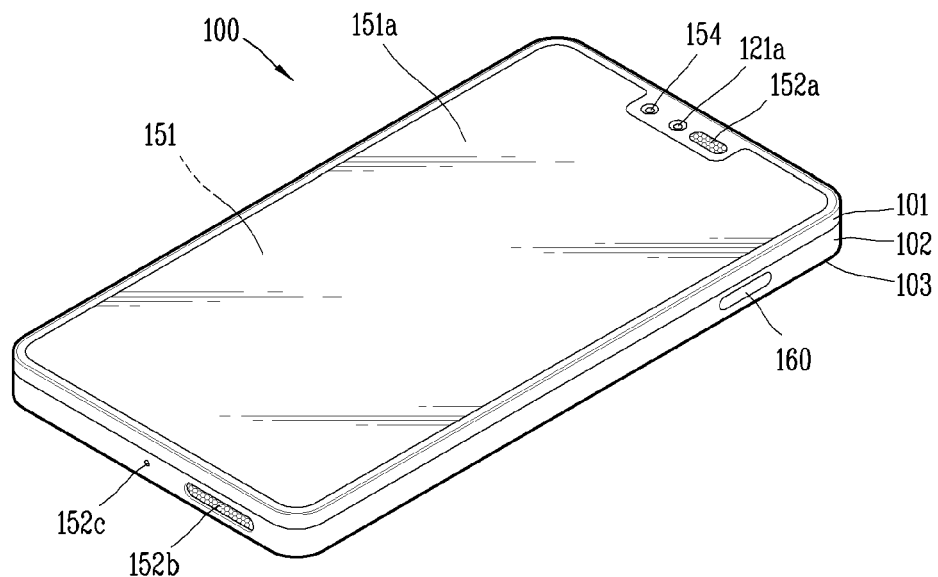
FIGS. 2B and 2C are conceptual views illustrating one example of an electronic device according to the present disclosure, viewed from different directions.
Figure 2C:
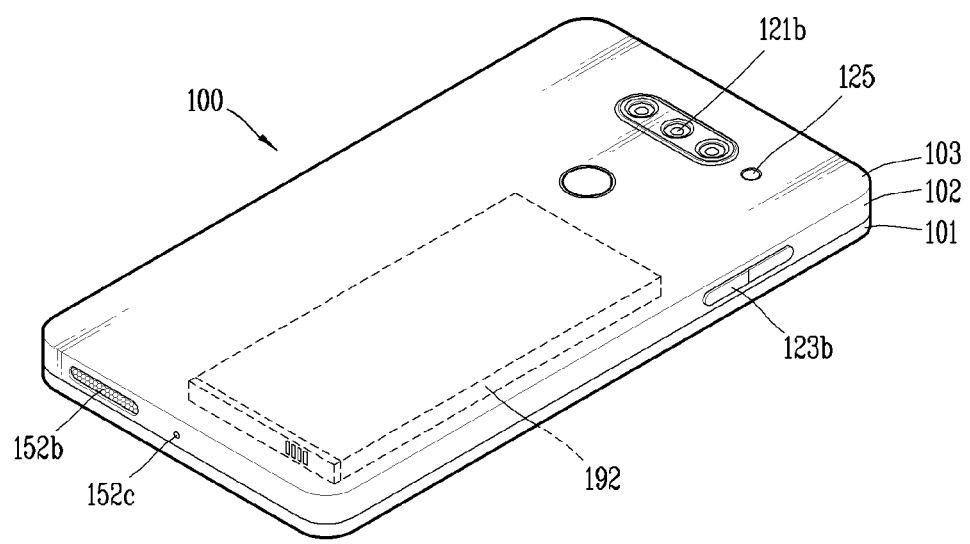

FIG. 1 is a view illustrating a configuration for describing an electronic device in accordance with one embodiment, and an interface between the electronic device and an external device or server. Meanwhile, referring to FIGS. 2A to 2B, FIG. 2A is a view illustrating a detailed configuration of the electronic device of FIG. 1. FIGS. 2B and 2C are conceptual views illustrating one example of an electronic device according to the present disclosure, viewed from different directions.

Referring to FIG. 1, the electronic device 100 may include a communication interface 110, an input interface (or an input device) 120, an output interface (or an output device) 150, and a processor 180. Here, the communication interface 110 may refer to the wireless communication module 110. The electronic device 100 may further include a display 151 and a memory 170. It is understood that implementing all of the illustrated components illustrated in FIG. 1 is not a requirement, and that greater or fewer components may alternatively be implemented.

In more detail, among others, the wireless communication module 110 may typically include one or more modules which permit communications such as wireless communications between the electronic device 100 and a wireless communication system, communications between the electronic device 100 and another electronic device, or communications between the electronic device 100 and an external server. Further, the wireless communication module 110 may typically include one or more modules which connect the electronic device 100 to one or more networks. Here, the one or more networks may be, for example, a 4G communication network and a 5G communication network.

Referring to FIGS. 1 and 2A, the wireless communication module 110 may include at least one of a 4G wireless communication module 111, a 5G wireless communication module 112, a short-range communication module 113, and a location information module 114. The 4G wireless communication module 111, the 5G wireless communication module 112, the short-range communication module 113, and the location information module 114 may be implemented as a baseband processor such as a modem. In one example, the 4G wireless communication module 111, the 5G wireless communication module 112, the short-range communication module 113, and the location information module 114 may be implemented as a transceiver circuit operating in an IF band and a baseband processor. The RF module 1200 may be implemented as an RF transceiver circuit operating in an RF frequency band of each communication system. However, the present disclosure may not be limited thereto. Each of the 4G wireless communication module 111, the 5G wireless communication module 112, the short-range communication module 113, and the location information module 114 may include an RF module.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station. In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. In some examples, a Sub 6 frequency band, which is a range of 6 GHz or less, may be used as the 5G frequency band.

On the other hand, a millimeter-wave (mmWave) range may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication module 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement may be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device may be acquired based on information related to a wireless Access Point (AP) which transmits or receives a wireless signal to or from the Wi-Fi module. If desired, the location information module 114 may alternatively or additionally function with any of the other modules of the wireless communication module 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input device 120 may include a pen sensor 122, a key button 123, a voice input module 124, a touch panel 151a, and the like. The input device 120 may include a camera module 121 or an image input unit for obtaining images or video, a microphone 152c or an audio input unit for inputting an audio signal, and a user input unit 123 (for example, a touch key, a mechanical key, and the like) for allowing a user to input information. Data (for example, audio, video, image, and the like) may be obtained by the input device 120 and may be analyzed and processed according to user commands.

The camera module 121 is a device capable of capturing still images and moving images. According to one embodiment, the camera module 121 may include one or more image sensors (e.g., a front sensor or a rear sensor), a lens, an image signal processor (ISP), or a flash (e.g., LED or lamp).

The sensor module 140 may typically be implemented using one or more sensors configured to sense internal information of the electronic device, the surrounding environment of the electronic device, user information, and the like. For example, the sensor module 140 includes at least one of a gesture sensor 340a, a gyro sensor 340b, an air pressure sensor 340c, a magnetic sensor 340d, an acceleration sensor 340e, a grip sensor 340f, and a proximity sensor 340g, a color sensor 340h (e.g. RGB (red, green, blue) sensor), a bio-sensor 340i, a temperature/humidity sensor 340j, an illuminance sensor 340k, an ultra violet (UV) sensor 340l, a light sensor 340m, and a hall sensor 340n. The sensor module 140 may also include at least one of a finger scan sensor, an ultrasonic sensor, an optical sensor (for example, camera 121), a microphone (see 152c), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output interface 150 may typically be configured to output various types of information, such as audio, video, tactile output, and the like. The output interface 150 may be shown having at least one of a display 151, an audio module 152, a haptic module 153, and an indicator 154.

The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user. For example, the display 151 may include a liquid crystal display (LCD), a light radiateting diode (LED) display, an organic light radiateting diode (OLED) display, a micro electromechanical systems (MEMS) display, or an electronic paper. For example, the display 151 may display various contents (e.g., text, images, videos, icons, and/or symbols, etc.). The display 151 may include a touch screen, and may receive, for example, a touch, gesture, proximity, or hovering input using an electronic pen or a part of the user's body.

Meanwhile, the display 151 may include a touch panel 151a, a hologram device 151b, a projector 151c, and/or a control circuit for controlling them. In this regard, the panel may be implemented to be flexible, transparent, or wearable. The panel may include the touch panel 151a and one or more modules. The hologram device 151b may display a stereoscopic image in the air by using light interference. The projector 151c may display an image by projecting light onto a screen. The screen may be located inside or outside the electronic device 100, for example.

The audio module 152 may interwork with the receiver 152a, the speaker 152b, and the microphone 152c. Meanwhile, the haptic module 153 may convert an electrical signal into a mechanical vibration, and generate a vibration or a haptic effect (e.g., pressure, texture). The electronic device may include a mobile TV supporting device (e.g., a GPU) that may process media data as per, e.g., digital multimedia broadcasting (DMB), digital video broadcasting (DVB), or mediaFlo™ standards. The indicator 154 may indicate a particular state of the electronic device 100 or a part (e.g., the processor 310) of the electronic device, including, e.g., a booting state, a message state, or a recharging state.

The wired communication module 160 which may be implemented as an interface unit may serve as a passage with various types of external devices connected to the electronic device 100. The wired communication module 160 may include an HDMI 161, a USB 162, a connector/port 163, an optical interface 164, or a D-subminiature (D-sub) 165. The wired communication module 160, for example, may include any of wired or wireless ports, external power supply ports, wired or wireless data ports, memory card ports, ports for connecting a device having an identification module, audio input/output (I/O) ports, video I/O ports, earphone ports, and the like. The electronic device 100 may perform assorted control functions associated with a connected external device, in response to the external device being connected to the wired communication module 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of these application programs may be downloaded from an external server (e.g., a first server 310 or a second server 320) through wireless communication. Other application programs may be installed within the electronic device 100 at the time of manufacturing or shipping, which is typically the case for basic functions of the electronic device 100 (for example, receiving a call, placing a call, receiving a message, sending a message, and the like). Application programs may be stored in the memory 170, installed in the electronic device 100, and executed by the processor 180 to perform an operation (or function) for the electronic device 100.

In this regard, the first server 310 may be referred to as an authentication server, and the second server 320 may be referred to as a content server. The first server 310 and/or the second server 320 may be interfaced with the electronic device through a base station. Meanwhile, a part of the second server 320 corresponding to the content server may be implemented as a mobile edge cloud (MEC) 330 in units of base stations. This can implement a distributed network through the second server 320 implemented as the mobile edge cloud (MEC) 330, and shorten content transmission delay.

The memory 170 may include a volatile memory and/or a non-volatile memory. The memory 170 may also include an internal memory 170a and an external memory 170b. The memory 170 may store, for example, commands or data related to at least one of other components of the electronic device 100. According to an embodiment, the memory 170 may store software and/or a program 240. For example, the program 240 may include a kernel 171, middleware 172, an application programming interface (API) 173, or an application program (or "application") 174, and the like. At least some of the kernel 171, the middleware 172, and the API 174 may be referred to as an operating system (OS).

The kernel 171 may control or manage system resources (e.g., the bus, the memory 170, or the processor 180) that are used for executing operations or functions implemented in other programs (e.g., the middleware 172, the API 173, or the application program 174). In addition, the kernel 171 may provide an interface to control or manage system resources by accessing individual components of the electronic device 100 in the middleware 172, the API 173, or the application program 174.

The middleware 172 may play an intermediary so that the API 173 or the application program 174 communicates with the kernel 171 to exchange data. Also, the middleware 172 may process one or more task requests received from the application program 247 according to priorities. In one embodiment, the middleware 172 may give at least one of the application programs 174 a priority to use the system resources (e.g., the bus, the memory 170, or the processor 180) of the electronic device 100, and process one or more task requests. The API 173 is an interface for the application program 174 to control functions provided by the kernel 171 or the middleware 1723, and may include, for example, at least one interface or function (e.g., a command) for file control, window control, image processing, or text control.

The processor 180 may typically function to control an overall operation of the electronic device 100, in addition to the operations associated with the application programs. The processor 180 may provide or process information or functions appropriate for a user by processing signals, data, information and the like, which are input or output by the aforementioned various components, or activating application programs stored in the memory 170. Furthermore, the processor 180 may control at least part of the components illustrated in FIGS. 1 and 2A, in order to execute the application programs stored in the memory 170. In addition, the processor 180 may control a combination of at least two of those components included in the electronic device 100 to activate the application program.

The processor 180 may include one or more of a central processing unit (CPU), an application processor (AP), an image signal processor (ISP), a communication processor (CP), and a low power processor (e.g., sensor hub). For example, the processor 180 may execute a control of at least one of other components of the electronic device 100 and/or an operation or data processing related to communication.

The power supply unit 190 may be configured to receive external power or provide internal power in order to supply appropriate power required for operating elements and components included in the electronic device 100. The power supply unit 190 may include a power management module 191 and a battery 192, and the battery 192 may be a built-in battery or a replaceable battery. The power management module 191 may include a power management integrated circuit (PMIC), a charger IC, or a battery or fuel gauge. The PMIC may employ a wired and/or wireless charging method. The wireless charging method may include, for example, a magnetic resonance method, a magnetic induction method or an electromagnetic wave method, and may further include an additional circuit for wireless charging, for example, a coil loop, a resonance circuit, or a rectifier. The battery gauge may measure, for example, a remaining battery level, and voltage, current, or temperature during charging. For example, the battery 192 may include a rechargeable cell and/or a solar cell.

Each of the external device 100a, the first server 310, and the second server 320 may be the same or different type of device (e.g., external device or server) as or from the electronic device 100. According to an embodiment, all or some of operations executed on the electronic device 100 may be executed on another or multiple other electronic devices (e.g., the external device 100a, the first server 310 and the second server 320. According to an embodiment, when the electronic device 100 should perform a specific function or service automatically or at a request, the electronic device 100, instead of executing the function or service on its own or additionally, may request another device (e.g., the external device 100a, the first server 310, and the second server 320) to perform at least some functions associated therewith. The another electronic device (e.g., the external device 100a, the first server 310, and the second server 320) may execute the requested function or additional function and transfer a result of the execution to the electronic device 100. The electronic device 100 may provide the requested function or service by processing the received result as it is or additionally. For this purpose, for example, cloud computing, distributed computing, client-server computing, or mobile edge cloud (MEC) technology may be used.

At least part of the components may cooperably operate to implement an operation, a control or a control method of an electronic device according to various implementations disclosed herein. Also, the operation, the control or the control method of the electronic device may be implemented on the electronic device by an activation of at least one application program stored in the memory 170.

Referring to FIG. 1, a wireless communication system may include an electronic device 100, at least one external device 100a, a first server 310, and a second server 320. The electronic device 100 may be functionally connected to at least one external device 100a, and may control contents or functions of the electronic device 100 based on information received from the at least one external device 100a. According to an embodiment, the electronic device 100 may use the servers 310 and 320 to perform authentication for determining whether the at least one external device 100 includes or generates information conforming to a predetermined rule. Also, the electronic device 100 may display contents or control functions differently by controlling the electronic device 100 based on the authentication result. According to an embodiment, the electronic device 100 may be connected to at least one external device 100*a* through a wired or wireless communication interface to receive or transmit information. For example, the electronic device 100 and the at least one external device 100*a* include a near field communication (NFC), a charger (e.g., Information may be received or transmitted in a universal serial bus (USB)-C), ear jack, Bluetooth (BT), wireless fidelity (WiFi), or the like.

The electronic device 100 may include at least one of an external device authentication module 100-1, a content/function/policy information DB 100-2, an external device information DB 100-3, or a content DB 104. The at least one external device 100*a* which is an assistant device linked with the electronic device 100, may be a device designed for various purposes, such as convenience of use, more attractive appearance, enhancement of usability, etc. of the electronic device 100. At least one external device 100*a* may or may not be in physical contact with the electronic device 100. According to one implementation, the at least one external device 100*a* may be functionally connected to the electronic device 100 using a wired/wireless communication module to control information for controlling content or a function in the electronic device 100.

Meanwhile, the first server 310 may include a server or a cloud device for services related to the at least one external device 100*a* or a hub device for controlling services in a smart home environment. The first server 310 may include at least one of an external device authentication module 311, a content/function/policy information DB 312, an external device information DB 313, and an electronic device/user DB 314. The first server 310 may be referred to as an authentication management server, an authentication server, or an authentication-related server. The second server 320 may include a server or a cloud device for providing a service or content, or a hub device for providing a service in a smart home environment. The second server 320 may include at least one of a content DB 321, an external device specification information DB 322, a content/function/policy information management module 323, or a device/user authentication/management module 324. The second server 130 may be referred to as a content management server, a content server, or a content-related server.

Referring to FIGS. 2B and 2C, the disclosed electronic device 100 includes a bar-like terminal body. However, the present disclosure may not be necessarily limited to this, and may be also applicable to various structures such as a watch type, a clip type, a glasses type, a folder type in which two or more bodies are coupled to each other in a relatively movable manner, a flip type, a slide type, a swing type, a swivel type, and the like. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this embodiment, the electronic device 100 may include a front case 101 and a rear case 102. Various electronic components may be incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some implementations, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted on the rear case 102 are exposed to the outside. Meanwhile, part of a side surface of the rear case 102 may be implemented to operate as a radiator.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121*b* or an audio output module 152*b*.

The electronic device 100, referring to FIGS. 2A to 2C, may include a display 151, first and second audio output modules 152*a*, 152*b*, a proximity sensor 141, an illumination sensor 152, an optical output module 154, first and second cameras 121*a*, 121*b*, first and second manipulation units 123*a*, 123*b*, a microphone 152*c*, a wired communication module 160, and the like.

The display 151 is generally configured to output information processed in the electronic device 100. For example, the display 151 may display execution screen information of an application program executing at the electronic device 100 or user interface (UI) and graphic user interface (GUI) information in response to the execution screen information.

The display 151 may be implemented using two display devices, according to the configuration type thereof. For instance, a plurality of the display units 151 may be arranged on one side, either spaced apart from each other, or these devices may be integrated, or these devices may be arranged on different surfaces.

The display 151 may include a touch sensor that senses a touch with respect to the display 151 so as to receive a control command in a touch manner. Accordingly, when a touch is applied to the display 151, the touch sensor may sense the touch, and a processor 180 may generate a control command corresponding to the touch. Contents input in the touch manner may be characters, numbers, instructions in various modes, or a menu item that may be specified.

In this way, the display 151 may form a touch screen together with the touch sensor, and in this case, the touch screen may function as the user input unit (123, see FIG. 2A). In some cases, the touch screen may replace at least some of functions of a first manipulation unit 123*a*.

The first audio output module 152*a* may be implemented as a receiver for transmitting a call sound to a user's ear and the second audio output module 152*b* may be implemented as a loud speaker for outputting various alarm sounds or multimedia playback sounds.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the processor 180 may control the optical output module 154 to stop the light output.

The first camera 121*a* may process image frames such as still or moving images obtained by the image sensor in a capture mode or a video call mode. The processed image frames can then be displayed on the display 151 or stored in the memory 170.

The first and second manipulation units 123*a* and 123*b* are examples of the user input unit 123, which may be manipulated by a user to provide input to the electronic device 100. The first and second manipulation units 123*a* and 123*b* may also be commonly referred to as a manipulating portion. The first and second manipulation units 123*a* and 123*b* may employ any method if it is a tactile manner allowing the user to perform manipulation with a tactile feeling such as touch, push, scroll or the like. The first and second manipulation units 123*a* and 123*b* may also be manipulated through a proximity touch, a hovering touch, and the like, without a user's tactile feeling.

On the other hand, the electronic device 100 may include a finger scan sensor which scans a user's fingerprint. The processor 180 may use fingerprint information sensed by the finger scan sensor as an authentication means. The finger scan sensor may be installed in the display 151 or the user input unit 123.

The wired communication module 160 may serve as a path allowing the electronic device 100 to interface with external devices. For example, the wired communication module 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the electronic device 100. The wired communication module 160 may be implemented in the form of a socket for accommodating an external card, such as Subscriber Identification Module (SIM), User Identity Module (UIM), or a memory card for information storage.

The second camera 121*b* may be further mounted to the rear surface of the terminal body. The second camera 121*b* may have an image capturing direction, which is substantially opposite to the direction of the first camera unit 121*a*. The second camera 121*b* may include a plurality of lenses arranged along at least one line. The plurality of lenses may be arranged in a matrix form. The cameras may be referred to as an 'array camera.' When the second camera 121*b* is implemented as the array camera, images may be captured in various manners using the plurality of lenses and images with better qualities may be obtained. The flash 125 may be disposed adjacent to the second camera 121*b*. When an image of a subject is captured with the camera 121*b*, the flash 125 may illuminate the subject.

The second audio output module 152*b* may further be disposed on the terminal body. The second audio output module 152*b* may implement stereophonic sound functions in conjunction with the first audio output module 152*a*, and may be also used for implementing a speaker phone mode for call communication. The microphone 152*c* may be configured to receive the user's voice, other sounds, and the like. The microphone 152*c* may be provided at a plurality of places, and configured to receive stereo sounds.

At least one antenna for wireless communication may be disposed on the terminal body. The antenna may be embedded in the terminal body or formed in the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter-wave (mmWave) band, as each of the plurality of antennas is implemented as an array antenna, a plurality of array antennas may be arranged in the electronic device.

The terminal body is provided with a power supply unit 190 (see FIG. 2A) for supplying power to the electronic device 100. The power supply unit 190 may include a batter 191 which is mounted in the terminal body or detachably coupled to an outside of the terminal body.

Hereinafter, description will be given of embodiments of a multi-communication system and an electronic device having the same, specifically, an antenna in a heterogeneous radio system and an electronic device having the same according to the present disclosure, with reference to the accompanying drawings. It will be apparent to those skilled in the art that the present disclosure may be embodied in other specific forms without departing from the idea or essential characteristics thereof.

Hereinafter, detailed operations and functions of an electronic device having a plurality of antennas according to one implementation that includes the 4G/5G communication modules as illustrated in FIG. 2A will be discussed.

In a 5G communication system according to an embodiment, a 5G frequency band may be a higher frequency band than a sub-6 band. For example, the 5G frequency band may be an mmWave band but is not limited thereto, and may be changed depending on applications.

Figure 3A:
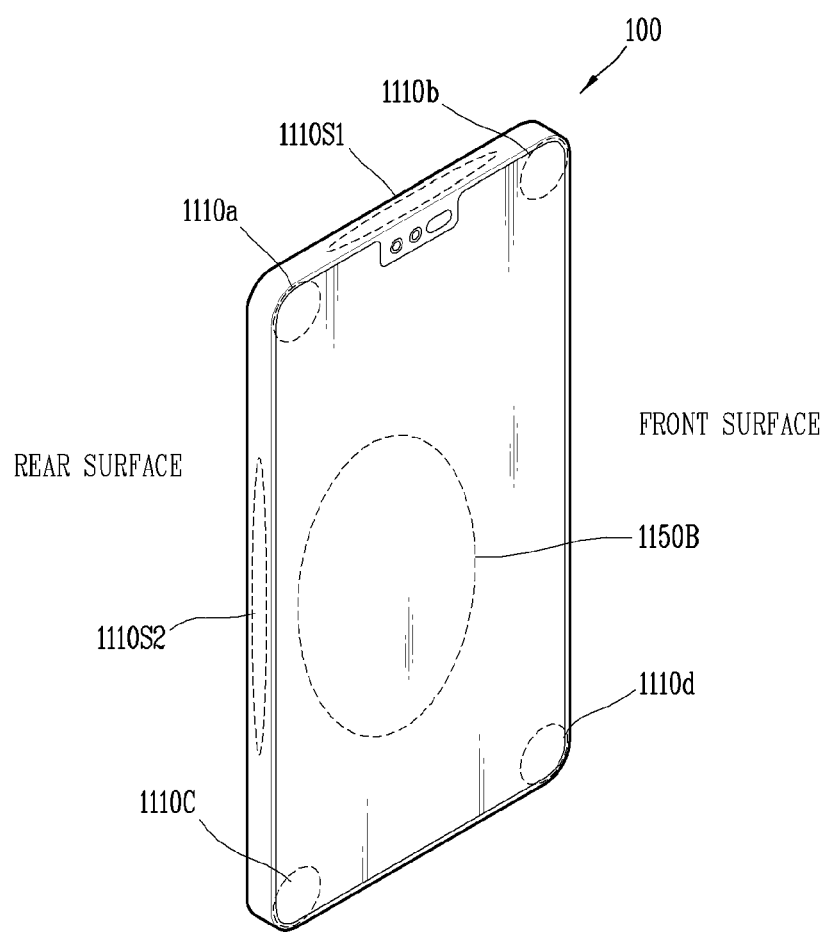
FIG. 3A illustrates an exemplary configuration in which a plurality of antennas of the electronic device may be arranged.

FIG. 3A illustrates an exemplary configuration in which a plurality of antennas of the electronic device may be arranged. Referring to FIG. 3, a plurality of antennas 1110*a* to 1110*d* may be arranged in the electronic device 100 or on a front surface of the electronic device 100. In this regard, the plurality of antennas 1110*a* to 1110*d* may be implemented in a form printed on a carrier inside the electronic device or may be implemented in a form of system-on-chip (Soc) together with an RFIC. The plurality of antennas 1110*a* to 1110*d* may be disposed on the front surface of the electronic device in addition to the inside of the electronic device. Here, the plurality of antennas 1110*a* to 1110*d* disposed on the front surface of the electronic device 100 may be implemented as transparent antennas embedded in the display.

A plurality of antennas 1110S1 and 1110S2 may also be disposed on side surfaces of the electronic device 100. In this regard, 4G antennas in the form of conductive members may be disposed on the side surfaces of the electronic device 100, slots may be formed in conductive member regions such that the plurality of antennas 1110*a* to 1110*d* can radiate 5G signals through the slots. Antennas 1150B may additionally be disposed on the rear surface of the electronic device 100 to radiate 5G signals rearward.

In some examples, at least one signal may be transmitted or received through the plurality of antennas 1110S1 and 1110S2 on the side surfaces of the electronic device 100. In some examples, at least one signal may be transmitted or received through the plurality of antennas 1110*a* to 1110*d*, 1150B, 1110S1, and 1110S2 on the front surface and/or the side surfaces of the electronic device 100. The electronic device may perform communication with a base station through any one of the plurality of antennas 1110a to 1110d, 1150B, 1110S1, and 1110S2. Alternatively, the electronic device may perform MIMO communication with a base station through two or more antennas among the plurality of antennas 1110a to 1110d, 1150B, 1110S1, 1110S2.

Figure 3B:
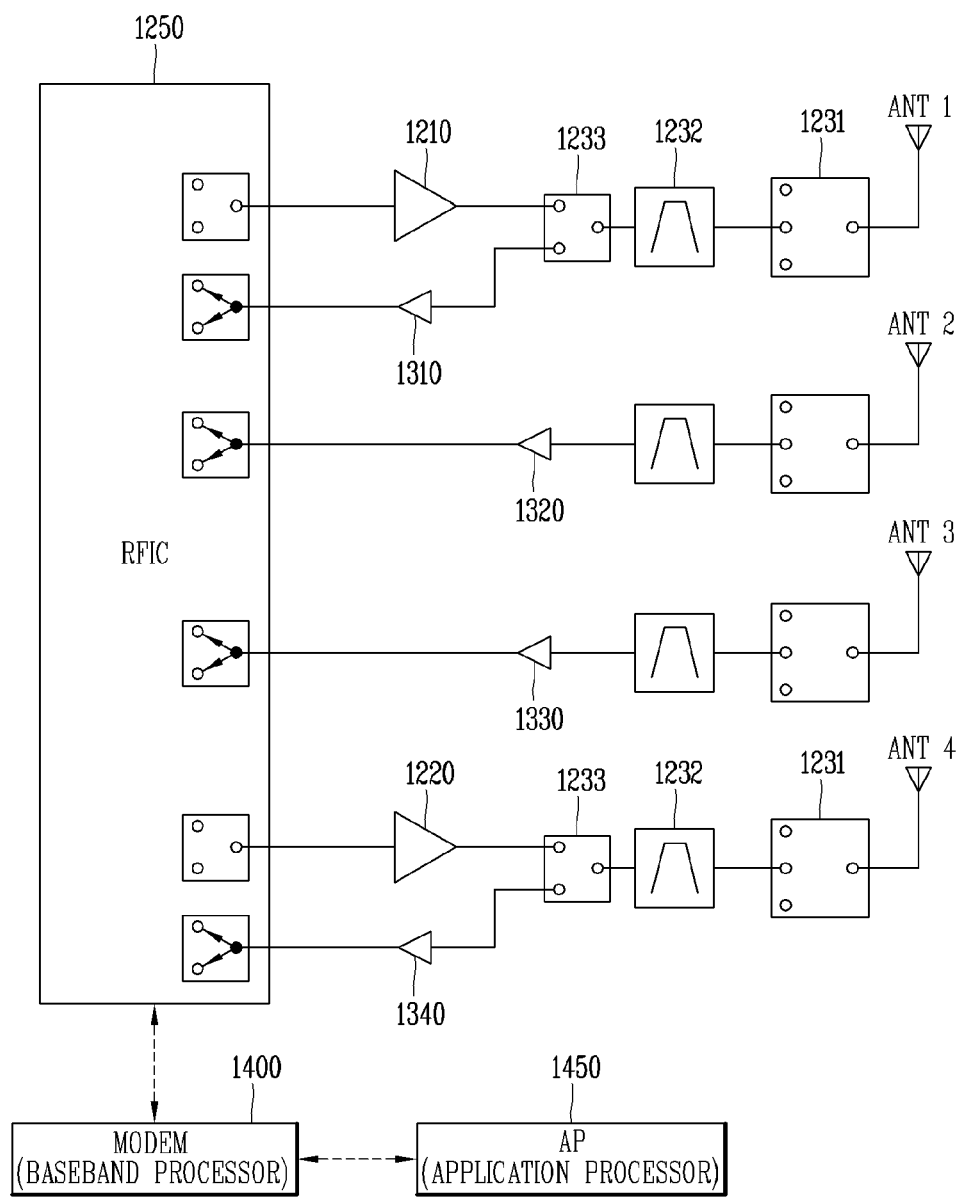
FIG. 3B is a diagram illustrating a configuration of a wireless communication module of an electronic device operable in a plurality of wireless communication systems according to an embodiment.

FIG. 3B is a diagram illustrating a configuration of a wireless communication module of an electronic device operable in a plurality of wireless communication systems according to an embodiment. Referring to FIG. 3B, the electronic device may include a first power amplifier 1210, a second power amplifier 1220, and an RFIC 1250. In addition, the electronic device may further include a modem 400 and an application processor (AP) 500. Here, the modem 400 and the application processor (AP) 500 may be physically implemented on a single chip, and may be implemented in a logically and functionally separated form. However, the present disclosure may not be limited thereto and may be implemented in the form of a chip that is physically separated according to an application.

Meanwhile, the electronic device may include a plurality of low noise amplifiers (LNAs) 410 to 440 in the receiver. Here, the first power amplifier 1210, the second power amplifier 1220, the RFIC 1250, and the plurality of low noise amplifiers 310 to 340 are all operable in a first communication system and a second communication system. In this case, the first communication system and the second communication system may be a 4G communication system and a 5G communication system, respectively.

As illustrated in FIG. 3B, the RFIC 1250 may be configured as a 4G/5G integrated type, but the present disclosure may not be limited thereto. The RFIC 250 may be configured as a 4G/5G separate type according to an application. When the RFIC 1250 is configured as the 4G/5G integrated type, it may be advantageous in terms of synchronization between 4G and 5G circuits, and simplification of control signaling by the modem 1400.

On the other hand, when the RFIC 1250 is configured as the 4G/5G separate type, it may be referred to as a 4G RFIC and a 5G RFIC, respectively. In particular, when there is a great band difference between the 5G band and the 4G band, such as when the 5G band is configured as a millimeter wave band, the RFIC 1250 may be configured as a 4G/5G separated type. As such, when the RFIC 1250 is configured as the 4G/5G separate type, there may be an advantage that the RF characteristics may be optimized for each of the 4G band and the 5G band.

Meanwhile, even when the RFIC 1250 is configured as the 4G/5G separate type, the 4G RFIC and the 5G RFIC may be logically and functionally separated but physically implemented in one chip.

On the other hand, the application processor (AP) 1450 may be configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate power circuits of a transmitter and a receiver through the RFIC 1250 in a low power mode.

In this regard, when it is determined that the electronic device is in an idle mode, the application processor (AP) 500 may control the RFIC 1250 through the modem 300 as follows. For example, when the electronic device is in an idle mode, the application processor 280 may control the RFIC 1250 through the modem 400, such that at least one of the first and second power amplifiers 110 and 120 operates in the low power mode or is turned off.

According to another implementation, the application processor (AP) 500 may control the modem 300 to enable wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, even though a throughput is slightly sacrificed, the application processor (AP) 500 may control the modem 1400 and the RFIC 1250 to perform short-range communication using only the short-range communication module 113.

According to another implementation, when a remaining battery capacity of the electronic device is equal to or greater than a threshold value, the application processor 1450 may control the modem 300 to select an optimal wireless interface. For example, the application processor (AP) 1450 may control the modem 1400 to receive data through both the 4G base station and the 5G base station according to the remaining battery capacity and the available radio resource information. In this case, the application processor (AP) 1450 may receive the remaining battery capacity information from the PMIC and the available radio resource information from the modem 1400. Accordingly, when the remaining battery capacity and the available radio resources are sufficient, the application processor (AP) 500 may control the modem 1400 and the RFIC 1250 to receive data through both the 4G base station and 5G base station.

Meanwhile, in a multi-transceiving system of FIG. 3B, a transmitter and a receiver of each radio system may be integrated into a single transceiver. Accordingly, a circuit portion for integrating two types of system signals may be removed from an RF front-end.

In addition, since the front-end component may be controlled by the integrated transceiver, the front-end component may be more efficiently integrated than a case where the transceiving system is separated for each communication system.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems may be controlled as needed, system delay may be minimized, and resources may be efficiently allocated.

Meanwhile, the first power amplifier 1210 and the second power amplifier 1220 may operate in at least one of the first and second communication systems. In this regard, when the 5G communication system operates in a 4G band or a Sub 6 band, the first and second power amplifiers 1210 and 1220 can operate in both the first and second communication systems.

On the other hand, when the 5G communication system operates in a millimeter wave (mmWave) band, one of the first and second power amplifiers 1210 and 1220 may operate in the 4G band and the other in the millimeter-wave band.

On the other hand, two different wireless communication systems may be implemented in one antenna by integrating a transceiver and a receiver to implement a two-way antenna. In this case, 4×4 MIMO may be implemented using four antennas as illustrated in FIG. 2. At this time, 4×4 DL MIMO may be performed through downlink (DL).

Meanwhile, when the 5G band is a Sub 6 band, first to fourth antennas ANT1 to ANT4 may be configured to operate in both the 4G band and the 5G band. On the contrary, when the 5G band is the millimeter wave (mmWave) band, first to fourth antennas ANT1 to ANT4 may be configured to operate in either one of the 4G band and the 5G band. In this case, when the 5G band is the millimeter wave (mmWave) band, each of the plurality of antennas may be configured as an array antenna in the millimeter wave band.

Meanwhile, 2×2 MIMO may be implemented using two antennas connected to the first power amplifier 1210 and the second power amplifier 1220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented by 1 Tx, only one of the first and second power amplifiers 1210 and 1220 need to operate in the 5G band. Meanwhile, when the 5G communication system is implemented by 4 Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 1250. Accordingly, a separate component does not need to be placed outside, thereby improving component mounting performance. In detail, a transmitter (TX) of two different communication systems may be selected by using a single pole double throw (SPDT) type switch provided in the RFIC corresponding to the controller 1250.

In addition, the electronic device capable of operating in a plurality of wireless communication systems according to an embodiment may further include a phase controller 1230, a duplexer 1231, a filter 1232, and a switch 1233.

In a frequency band such as a mmWave band, the electronic device needs to use a directional beam to secure coverage for communication with a base station. To this end, each of the antennas ANT1 to ANT4 needs to be implemented as an array antenna ANT1 to ANT4 including a plurality of antenna elements. Specifically, the phase controller 1230 may control a phase of a signal applied to each antenna element of each of the array antennas ANT1 to ANT4. Specifically, the phase controller 1230 may control both magnitude and phase of a signal applied to each antenna element of each of the array antennas ANT1 to ANT4. Since the phase controller 1230 controls both the magnitude and the phase of the signal, it may be referred to as a power and phase controller 1230.

Therefore, by controlling the phase of the signal applied to each antenna element of each of the array antennas ANT1 to ANT4, beam-forming may be independently performed through each of the array antennas ANT1 to ANT4. In this regard, multi-input/multi-output (MIMO) may be performed through each of the array antennas ANT1 to ANT4. In this case, the phase controller 1230 may control the phase of the signal applied to each antenna element so that each of the array antennas ANT1 to ANT4 can form beams in different directions.

The duplexer 1231 may be configured to separate a signal in a transmission band and a signal in a reception band from each other. In this case, the signal in the transmission band transmitted through the first and second power amplifiers 1210 and 1220 may be applied to the antennas ANT1 and ANT4 through a first output port of the duplexer 1231. On the contrary, signals in a reception band received through the antennas ANT1 and ANT4 are received by the low noise amplifiers 310 and 340 through a second output port of the duplexer 1231.

The filter 1232 may be configured to pass a signal in a transmission band or a reception band and to block a signal in a remaining band. In this case, the filter 1232 may include a transmission filter connected to the first output port of the duplexer 1231 and a reception filter connected to the second output port of the duplexer 1231. Alternatively, the filter 1232 may be configured to pass only the signal in the transmission band or only the signal in the reception band according to a control signal.

The switch 1233 may be configured to transmit only one of a transmission signal and a reception signal. In an implementation of the present disclosure, the switch 1233 may be configured in a single-pole double-throw (SPDT) form to separate the transmission signal and the reception signal in a time division duplex (TDD) scheme. Here, the transmission signal and the reception signal are signals of the same frequency band, and thus the duplexer 1231 may be implemented in the form of a circulator.

Meanwhile, in another implementation of the present disclosure, the switch 1233 may also be applied to a frequency division multiplex (FDD) scheme. In this case, the switch 1233 may be configured in the form of a double-pole double-throw (DPDT) to connect or block a transmission signal and a reception signal, respectively. On the other hand, since the transmission signal and the reception signal may be separated by the duplexer 1231, the switch 1233 may not be necessarily required.

Meanwhile, the electronic device according to the implementation may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally distinguished from each other on one physical circuit.

The modem 1400 may perform controlling of signal transmission and reception and processing of signals through different communication systems using the RFID 1250. The modem 1400 may acquire control information from a 4G base station and/or a 5G base station. Here, the control information may be received through a physical downlink control channel (PDCCH), but may not be limited thereto.

The modem 1400 may control the RFIC 1250 to transmit and/or receive signals through the first communication system and/or the second communication system for a specific time interval and from frequency resources. Accordingly, the RFIC 1250 may control transmission circuits including the first and second power amplifiers 1210 and 1220 to transmit a 4G signal or a 5G signal in the specific time interval. In addition, the RFIC 1250 may control reception circuits including the first to fourth low noise amplifiers 1310 to 1340 to receive a 4G signal or a 5G signal at a specific time interval.

On the other hand, in the electronic device illustrated in FIGS. 1 to 2B, the specific configuration and function of the electronic device including the antennas disposed inside the electronic device as illustrated in FIG. 3A and the multi-transceiving system as illustrated in FIG. 3B will be described below.

In this regard, electronic devices may be configured to provide 5G communication services in various frequency bands. Recently, attempts have been made to provide 5G communication services using a Sub-6 band under a 6 GHz band. In the future, it is also expected to provide 5G communication services by using a millimeter-wave (mmWave) band in addition to the Sub-6 band for a faster data rate.

Meanwhile, a 28 GHz band, a 38.5 GHz band, and a 64 GHz band are being considered as frequency bands to be allocated for 5G communication services in such mmWave bands. In this regard, a plurality of array antennas may be disposed in an electronic device in the mmWave bands.

In this case, an array antenna capable of operating in a mmWave band may be mounted in an antenna module. An antenna element disposed in the antenna module may radiate a certain polarization signal. Signal reception characteristics of an antenna element that radiates a certain polarization signal may deteriorate when an electronic device is moved or rotated.

When one antenna module processes only one polarization signal, an antenna module should be additionally provided for multiple-input multiple-output (MIMO). Particularly, a vertical polarization antenna is difficult to be disposed in an antenna module having a certain height.

The present disclosure is directed to solving the aforementioned problems and other drawbacks. The present disclosure is also directed to providing an antenna module in which an array antenna operating in a millimeter wave band is disposed, and an electronic device including a configuration for controlling the antenna module.

The present disclosure is also directed to providing an antenna module including antenna elements with different polarizations orthogonal to each other in a millimeter wave band.

The present disclosure is also directed to providing a vertical polarization antenna in an antenna module having a certain height.

The present disclosure s also directed to providing an antenna structure for achieving vertical polarization while lowering a height.

The present disclosure is also directed to providing an antenna structure for reducing a level of interference between antennas with different polarizations.

Figure 4A:
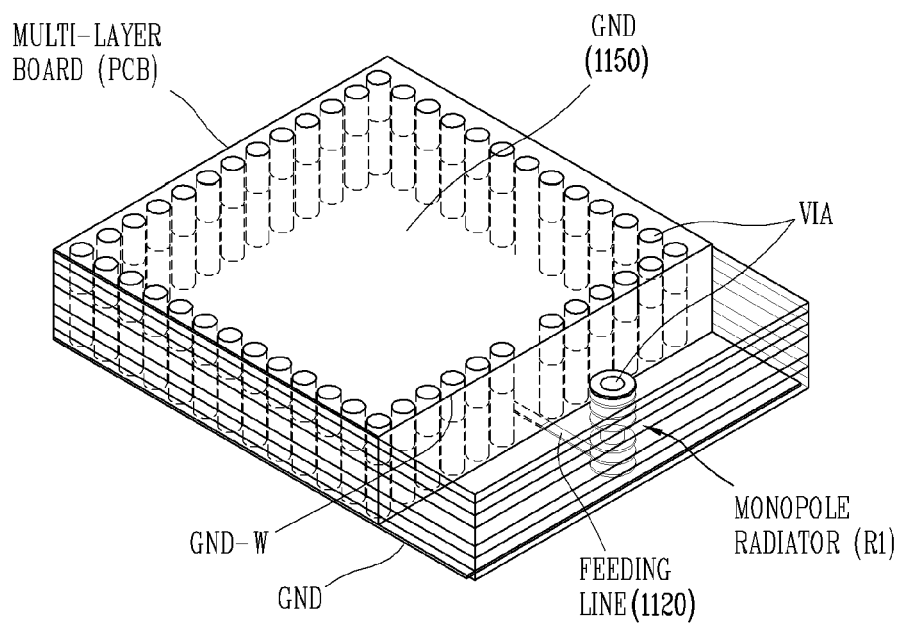
FIGS. 4A to 4C are a perspective view, a side view, and a front view illustrating an antenna module in which an antenna corresponding to a radiator is disposed according to an embodiment.
Figure 4B:
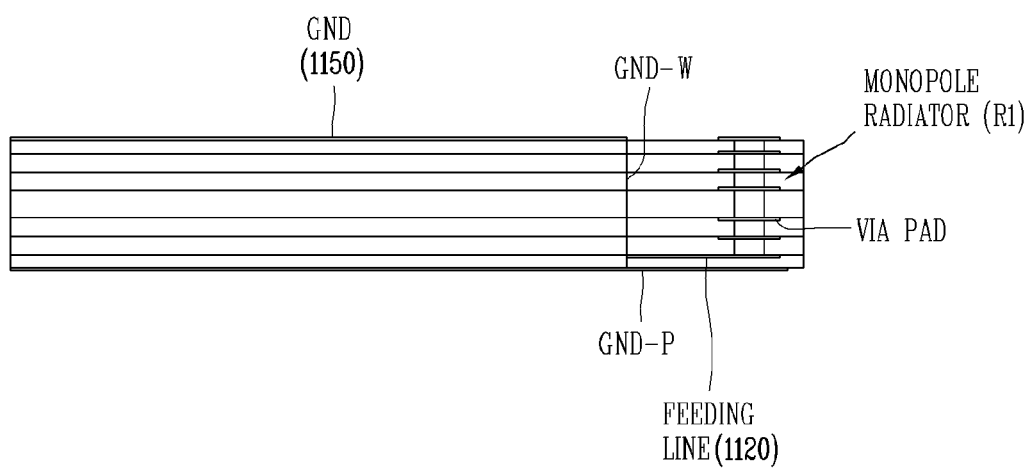
Figure 4C:
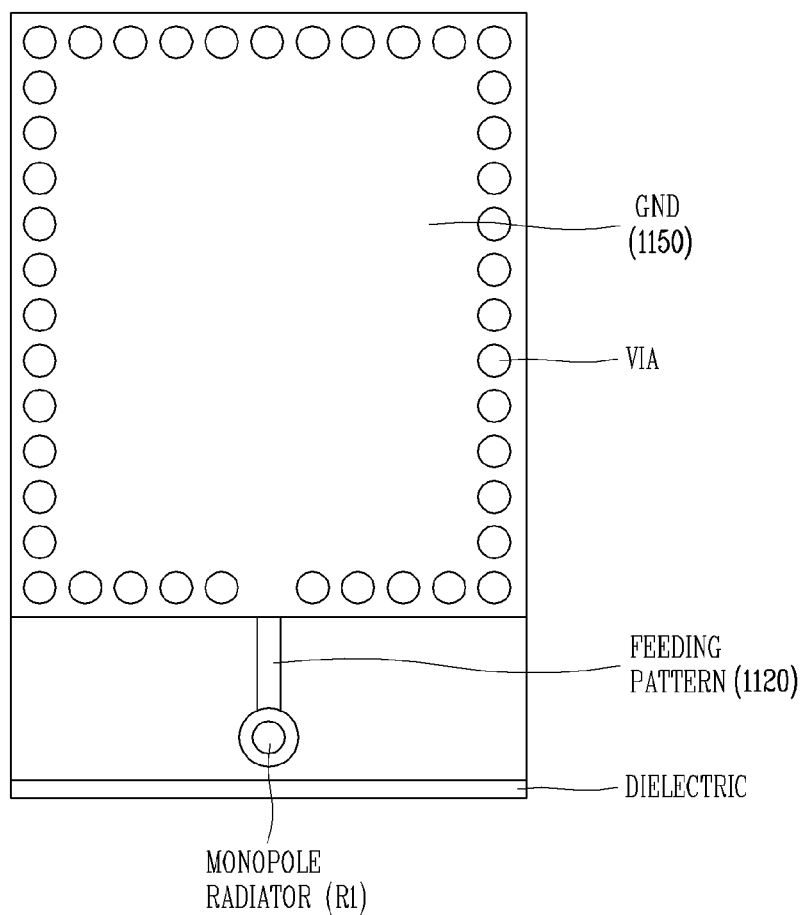
Figure 5A:
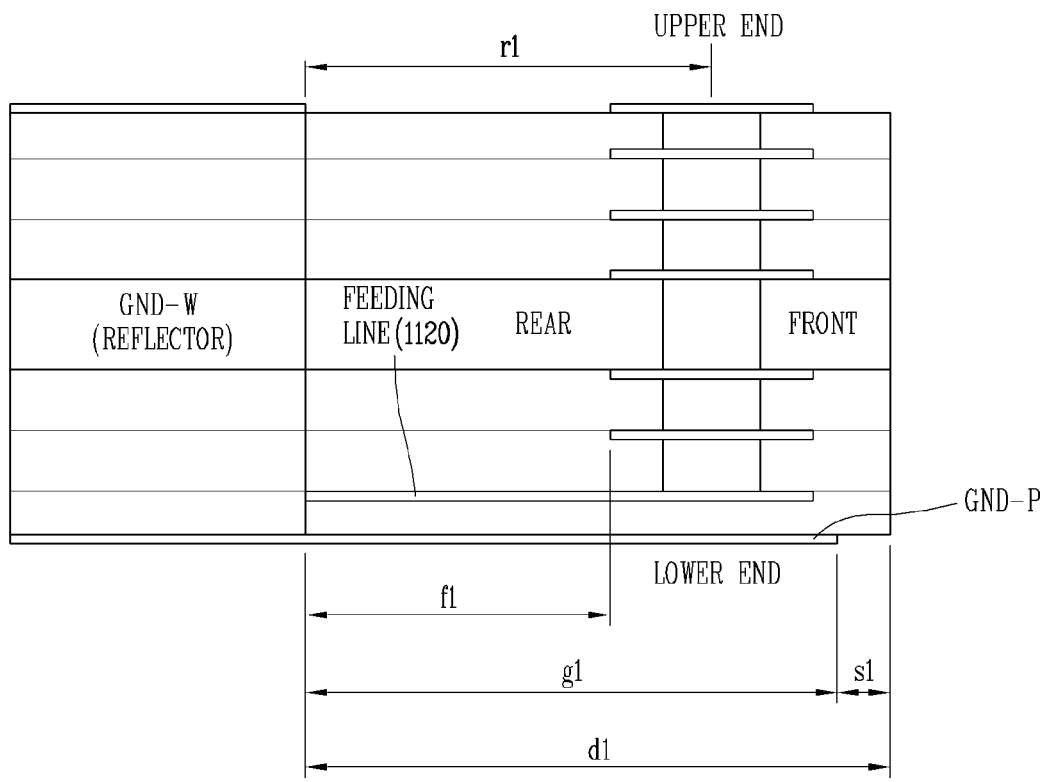
FIG. 5A is an enlarged side view illustrating the antenna module of FIG. 4B.
Figure 5B:
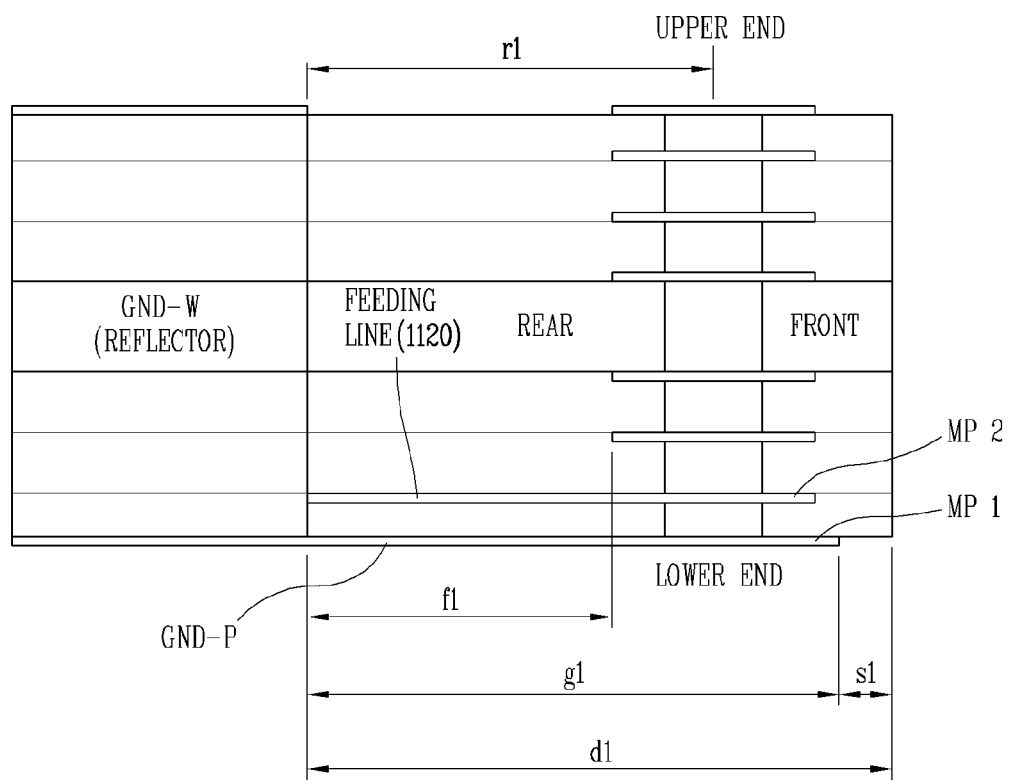
FIG. 5B illustrates a structure in which a ground line is connected to a monopole radiator according to another embodiment.

In this regard, FIGS. 4A to 4C are a perspective view, a side view, and a front view illustrating an antenna module in which an antenna corresponding to a radiator is disposed according to an embodiment. FIG. 5A is an enlarged side view illustrating the antenna module of FIG. 4B. FIG. 5B illustrates a structure in which a ground line is connected to a monopole radiator according to another embodiment.

Referring to FIGS. 4A to 5B, a radiator R1 may be configured by stacking metal patterns on different layers of a multi-layer substrate. In this regard, at least some of the metal patterns of the radiator R1 may be vertically connected to each other. For example, the metal patterns of the radiator R1 may be vertically connected to each other by a via.

One of the metal patterns of the radiator R1 may be connected to a feeding pattern. Meanwhile, the radiator R1 may be a monopole antenna, the length of which is determined as being about ¼ of a wavelength of an operating band. A ground layer 1150 may be disposed on different layers of the multi-layer substrate and operate as a ground for the radiator R1. In this regard, the radiator R1 may operate as a monopole antenna due to a ground pattern GND-P below a feeding pattern 1120 and the ground layer 1150 operating as a ground wall GND-W.

The ground wall GND-W may include a plurality of via holes configured to connect different ground planes on different layers of the multi-layer substrate to each other. The plurality of via holes may be provided on edges of the multi-layer substrate to be apart from each other by a certain distance.

Referring to FIG. 5B, a metal pattern MP1 at a lower end, among the metal patterns, may be connected to a ground pattern GND_P. In this regard, a metal pattern MP2 over the metal pattern MP1 connected to a ground pattern GND_P may be connected to the feeding pattern 1120. In this regard, a position to which the feeding pattern 1120 is connected is not limited to the metal pattern MP2, which is a second block from the lower end, and may be a metal pattern at an arbitrary position.

The radiator R1 described herein operates as a monopole antenna, operates as a vertical polarization end-fire antenna in a mmWave band, and has technical features described below.

1) Referring to FIGS. 4A to 5B, the radiator R1 may operate as a mmWave vertical polarization end-fire antenna having a high antenna gain.
2) Basically, the radiator R1 operates as a monopole antenna, the monopole antenna is configured as a multi-layer substrate, and an antenna module may be implemented in a form of a printed circuit board (PCB) or a package.
3) A monopole radiator has a form in which vertical vias on layers are connected and a via pad is provided on each of the layers.
4) Vias of the monopole radiator R1 may be provided on full layers. Alternatively, the vias of the monopole radiator R1 may be provided on some layers.
5) An operating frequency band of an antenna may be determined by a vertical length of the monopole radiator R1. Therefore, as a thickness of a PCB corresponding to the multi-layer substrate increases, the operating frequency band of the monopole radiator R1 may decrease. However, as a thickness of the PCB corresponding to the multi-layer substrate increases, the operating frequency band of the monopole radiator R1 may increase. For example, the thickness of the PCB may increase but the vertical length of the monopole radiator R1 in the PCB may decrease. As another example, although the vertical length of the monopole radiator R1 implemented in the PCB increases, the operating frequency band of the monopole radiator R1 may increase according to a feeding position and a position of the ground.
6) The vias may be configured in a zigzag form rather than in a form of a line to adjust an operating frequency of the monopole radiator R1 when a thickness of the PCB is limited. In the embodiment of FIGS. 4A to 5B, the vias are configured to be connected in a line. For example, an operating frequency of the monopole radiator R1 in which the vias are configured in the zigzag form may decrease. As an effective electric length of the monopole radiator R1 increases, the operating frequency of the monopole radiator R1 in which the vias are configured in the zigzag form may decrease. As another example, the operating frequency of the monopole radiator R1 may increase when the vias are configured in the zigzag form. The operating frequency of the monopole radiator R1 may increase even when the vias are configured in the zigzag form according to a feeding position and the position of the ground.

7) A feeding line corresponding to the feeding pattern 1120 is connected to a lower end of the monopole radiator R1 of FIG. 4B or 5B. The feeding line may be a transmission line, and electric power may be supplied to an antenna through the transmission line that is in the form of a strip line, a micro-strip line, a CPW, or a CPWG. In this regard, the feeding pattern 1120 may be disposed over the ground pattern GND_P below the monopole radiator R1. As another example, the feeding pattern 1120 may be disposed under the ground pattern GND_P. When the feeding pattern 1120 is disposed under the ground pattern GND_P, electric power may be supplied to the monopole radiator R1 through a via hole in the ground pattern GND_P.

8) The ground pattern GND_P corresponding to a ground of the lower end of the monopole radiator R1 may cause a reduction of a ground region to a part of the lower end rather than the entire lower end so as to obtain a high antenna gain in a forward direction.

9) The ground wall GND-W may be provided on a rear surface of the monopole radiator R1 in an axial direction. The ground wall GND-W is configured as a via electrically connected on the multi-layer substrate. In this case, the feeding pattern 1120 may be disposed on the ground pattern GND_P at a bottom. Because the feeding pattern 1120 may be disposed inside a PCB, which is a multi-layer substrate, a via may not be disposed on a layer on which the feeding pattern 1120 is disposed.

10) End-fire radiation pattern characteristics, i.e., emission of radio waves in a forward direction, occur due to the ground pattern GND_P disposed in a partial region below the monopole radiator R1 and the ground wall GND-W on the rear surface of the monopole radiator R1.

Referring to FIGS. 5A and 5B, detailed parameters of the monopole radiator R1 may include a distance r1, a feeding length f1, a ground length g1, a dielectric length s1, and a substrate length d1. The detailed parameters of the monopole radiator R1 are described below.

1) The distance r1 is a distance between the monopole radiator R1 and the ground wall GND-W. The distance r1 may be defined as a length from a center of a via connecting the monopole radiator R1 to the ground wall GND_W on the rear surface.

2) The distance r1 may be determined as being one twentieth ($\lambda$eff/20) or more of an effective wavelength $\lambda$eff when a dielectric constant of a dielectric relative to an operating frequency of an antenna is taken into account. The distance r1 is set to operate the ground wall GND-W as a reflector. A peak gain of the monopole radiator R1 may be adjusted by adjusting the distance r1.

3) The feeding length f1 is a length of the feeding pattern 1120 when viewed from a side of the PCB which is a multi-layer substrate. The feeding length f1 may be defined as a length from the ground wall GND-W to the via pad of the monopole radiator R1.

4) The substrate length d1 is a length from the ground wall GND-W to a dielectric on a longitudinal section of the PCB which is multi-layer substrate.

5) The ground length g1 may be defined as a length of the ground pattern GND_P of the monopole radiator R1.

The ground length g1 may be set to be greater than or equal to the feeding length f1 and less than the substrate length d1.

6) The dielectric length s1 may be defined as a length of a region of an end portion of the dielectric on which a metal is not disposed. The dielectric length s1 may be set to 0 mm or greater.

Monopole radiators R1 described herein may be spaced apart from each other by a certain distance in an axis direction to improve an antenna gain in a forward direction. In this regard, FIGS. 6A to 6C are various views of a structure in which monopole radiators are spaced apart from each other by a certain distance in an axial direction according to an embodiment.

Figure 6A:
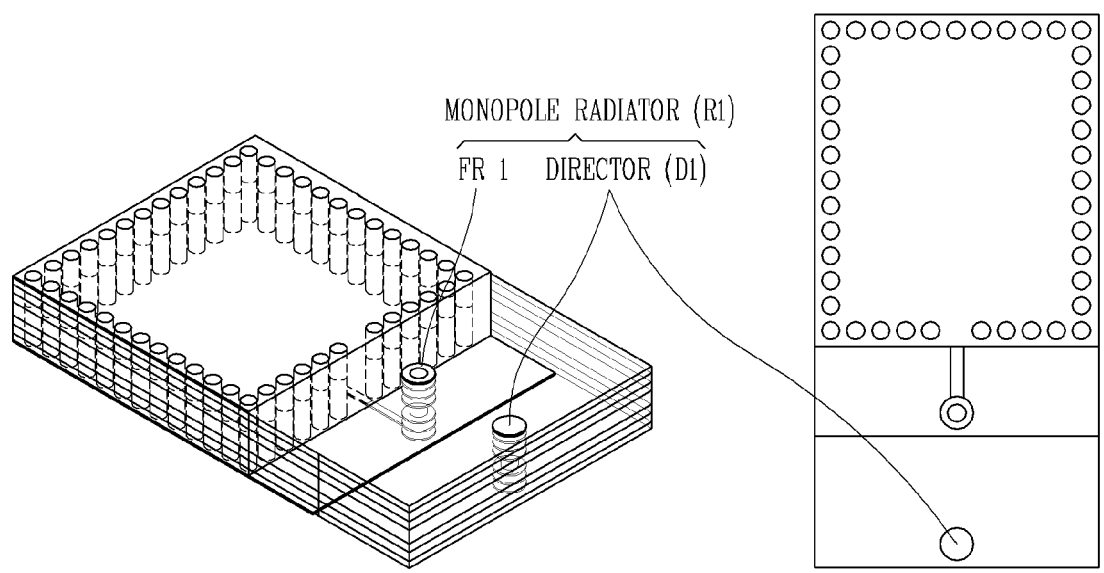
FIGS. 6A to 6C are various views of a structure in which monopole radiators are spaced apart from each other by a certain distance in an axial direction according to an embodiment.

Referring to FIG. 6A, one monopole radiator R1 may include a feeding radiator FR1 and a director D1. Referring to FIG. 6B, the feeding radiator FR1 and the director D1 may be spaced apart from each other by a distance r2 in an axial direction, e.g., a longitudinal direction. Referring to FIG. 6C, the monopole radiator R1 including the feeding radiator FR1 and the director D1 may be spaced apart from each other by a certain distance in another axial direction to constitute an array antenna 1100.

Figure 6B:
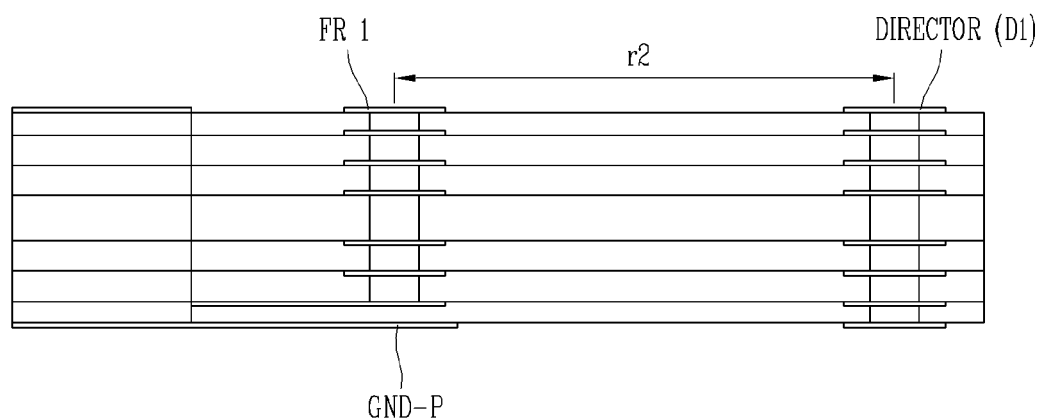
Figure 6C:
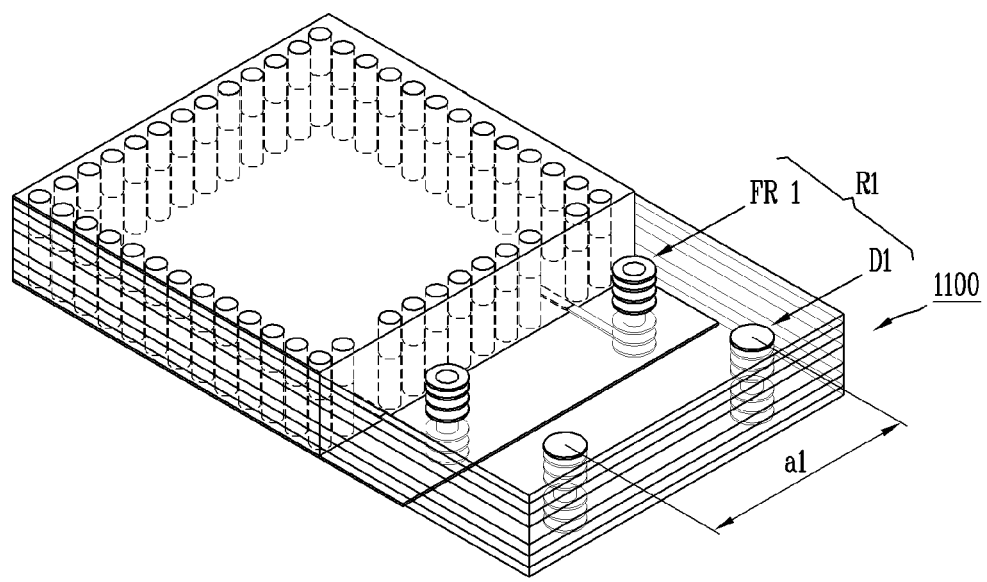

Referring to FIGS. 6A to 6C, the director D1 may not be connected to the feeding pattern 1120 and may be spaced apart from the feeding radiator FR1 by a certain distance in an axial direction for coupling of fields radiated from the monopole radiator R1.

The feeding radiator FR1 is configured by stacking metal patterns on different layers of a multi-layer substrate. The feeding radiator FR1 may be configured such that one of the metal patterns is connected to the feeding pattern 1120. The director D1 may be spaced apart from the feeding radiator FR1 by a certain distance in a longitudinal direction and configured by stacking metal patterns on different layers of the multi-layer substrate.

The director D1 may be configured such that the metal patterns are connected to each other. In this regard, adjacent metal patterns of the director D1 may be configured to be connected to each other through a via. A metal pattern of the director D1 may also be provided on a lowermost portion of the multi-layer substrate. In contrast, metal patterns of the feeding radiator FR1 may not be provided on the lowermost portion, and the ground pattern GND_P may be provided on the lowermost portion. Therefore, a vertical length of the director D1 may be provided to be greater than that of the feeding radiator FR1.

Referring to FIGS. 6A to 6C, the monopole radiator R1 including the feeding radiator FR1 and the director D1 has technical features described below.

1) The director D1 may be used to improve an antenna gain of the monopole radiator R1 in a forward direction.

2) With respect to the director D1, vias on respective layers of the multi-layer substrate may be electrically connected to each other, and adjacent layers may be connected to each other through the vias.

3) The vias of the director D1 may be provided on full layers of the multi-layer substrate. Alternatively, the vias of the director D1 may be provided only on some layers of the multi-layer substrate.

4) The distance r2 corresponds to a distance between the feeding radiator FR1 and the director D1 in the monopole radiator R1. The distance r2 may be set to be greater than or equal to $\lambda$eff./4 corresponding to ¼ of a wavelength corresponding to an operating frequency.

5) FIG. 6C illustrates an array antenna 1100 in which two monopole radiators R1 are arranged to be spaced apart from each other by a certain distance in a width direction.

6) A distance a1 between monopole radiators in the array antenna 1100 corresponds to a distance between elements in the array antenna 1100. In the array antenna 1100, the distance a1 between elements may be set to a value of 0.3λ0 to 1.0λ0 with reference to a wavelength of an operating frequency, i.e., λ0. In this regard, the distance a1 between elements in the array antenna 1100 may be set to 0.5λ0 to 0.7λ0 to perform beamforming at a certain angle or greater while reducing inter-device interference.

Figure 7A:
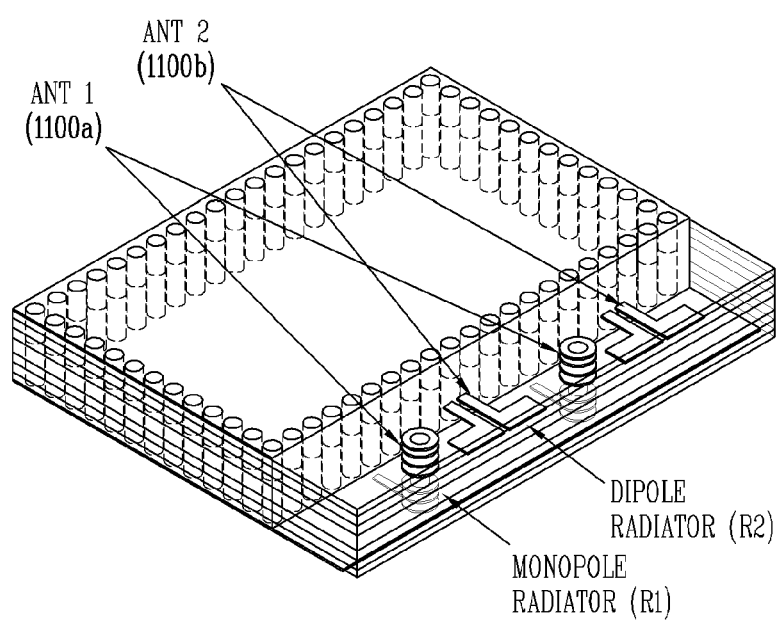
FIGS. 7A and 7B are a perspective view and a front view illustrating an antenna module in which a monopole radiator and a dipole radiator are disposed according to an embodiment.
Figure 7B:
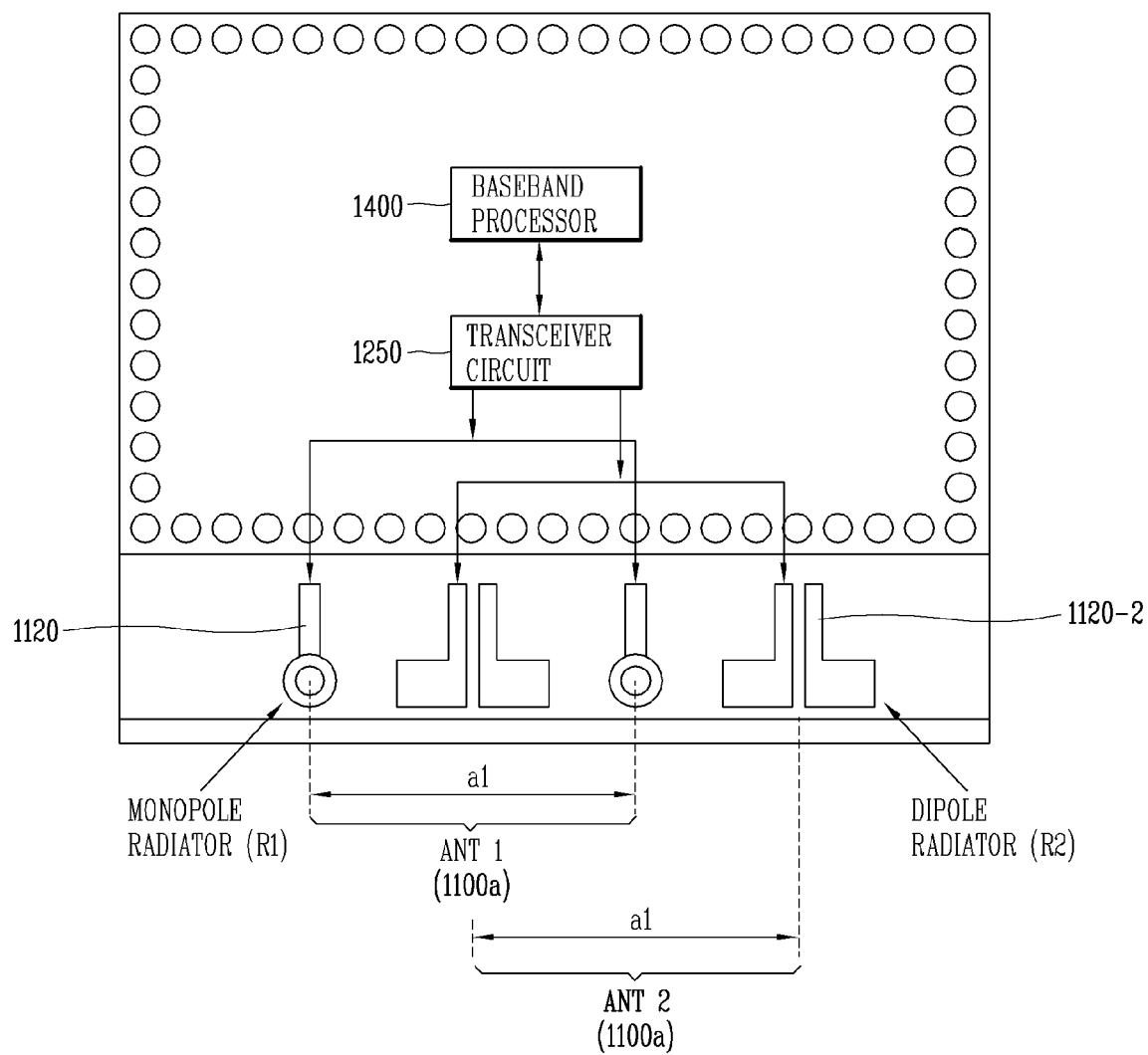

The monopole radiator R1 described herein may include a second radiator and an antenna module corresponding to a dipole antenna. In this regard, FIGS. 7A and 7B are a perspective view and a front view illustrating an antenna module in which a monopole radiator and a dipole radiator are disposed according to an embodiment. FIG. 7A is a perspective view illustrating a multi-layer substrate corresponding to an antenna module in which a monopole radiator and a dipole radiator are disposed. FIG. 7B is a front view illustrating the multi-layer substrate corresponding to the antenna module in which the monopole radiator and the dipole radiator are disposed. Referring to FIG. 7B, the monopole radiator and the dipole radiator are operably coupled to a transceiver circuit and a baseband processor corresponding to a modem.

Referring to FIGS. 7A and 7B, a first array antenna ANT1 1100a may include a plurality of radiators R1 spaced apart from each other by a certain distance in a width direction to perform beamforming. A second array antenna ANT2 1100b may include a plurality of second radiators R2 spaced apart from each other by a certain distance in the width direction to perform beamforming. In this regard, the radiator R1 of the first array antenna ANT1 1100a and the radiator R2 of the second array antenna ANT2 1100b may be alternately arranged but embodiments are not limited thereto.

Because the first array antenna ANT1 1100a and the second array antenna ATNT2 1100b operate in the same band, antenna elements may be disposed to be spaced the same distance from each other but embodiments are not limited thereto. For example, the plurality of first radiators R1 of the first array antenna ANT1 1100a may be disposed to be spaced a distance a1 from each other. The plurality of second radiators R2 of the second array antenna ANT2 1100b may be disposed to be spaced the distance a1 from each other.

As described above, each of the plurality of second radiators R2 may be disposed between two adjacent first radiators R1 among the plurality of first radiators R1. In this case, the radiator R1 of the first array antenna ANT1 1100a and the second radiator R2 of the second array antenna ANT2 1100b may be configured to have polarization characteristics of being orthogonal to each other.

The monopole radiator R1 and the dipole radiator R2 having different dual polarizations of FIGS. 7A and 7B have the technical features described below.

1) To implement a double-polarization array antenna, the monopole radiator R1 having vertical polarization characteristics and the dipole radiator R2 having horizontal polarization characteristics are alternately arranged.
2) The monopole radiator R1 and the dipole radiator R2 have different polarizations.
3) The monopole radiator R1 has vertical polarization characteristics.
4) The dipole radiator R2 has horizontal polarization characteristics.
5) Both a distance between elements of the first array antenna ANT1 1100a having the monopole radiator R1 and a distance between elements of the second array antenna ANT2 1100b having the dipole radiator R2 may be identically set to a1.
6) The monopole radiator R1 and the dipole radiator R2 are sequentially and alternately arranged in a horizontal direction.
7) Two types of antennas, i.e., the monopole radiator R1 and the dipole radiator R2 have different polarizations and thus operate independently from each other. Since the first array antenna ANT1 1100a and the second array antenna ANT2 1100b have polarization characteristics of being orthogonal to each other, the first array antenna ANT1 1100a and the second array antenna ANT2 1100b may be operated simultaneously at a same frequency band to implement MIMO.

Referring to FIG. 7B, one radiator R1 may be vertically disposed in the form of a monopole antenna on a multi-layer substrate and connected to a transceiver circuit 1250 through a feeding pattern 1120. One second radiator R2 may be vertically disposed in a form of a dipole antenna on one layer of the multi-layer substrate and connected to the transceiver circuit 1250 through a second feeding pattern 1120-2.

An electronic device including the first array antenna ANT1 1100a and the second array antenna ANT2 1100b may further include the transceiver circuit 1250 and a baseband processor 1400.

The transceiver circuit 1250 may be operatively coupled to one of the first array antenna ANT1 1100a and the second array antenna ANT2 1100b. The baseband processor 1400 may be operably coupled to the transceiver circuit 1250 and configured to control the transceiver circuit 1250. The baseband processor 1400 may control the transceiver circuit 1250 to perform MIMO through the first array antenna ANT1 1100a and the second array antenna ANT2 1100b.

The baseband processor 1400 may control the transceivercircuit 1250 to radiate a vertical polarization signal through the first array antenna ANT1 1100a and radiate a horizontal polarization signal through the second array antenna ANT2 1100b.

A ground pattern may be removed from a partial region of a ground area of a multi-layer substrate corresponding to an antenna module described herein to improve antenna radiation characteristics. In this regard, FIG. 8 illustrates an antenna module in which a partial portion of a ground area is removed according to an embodiment.

Figure 8:
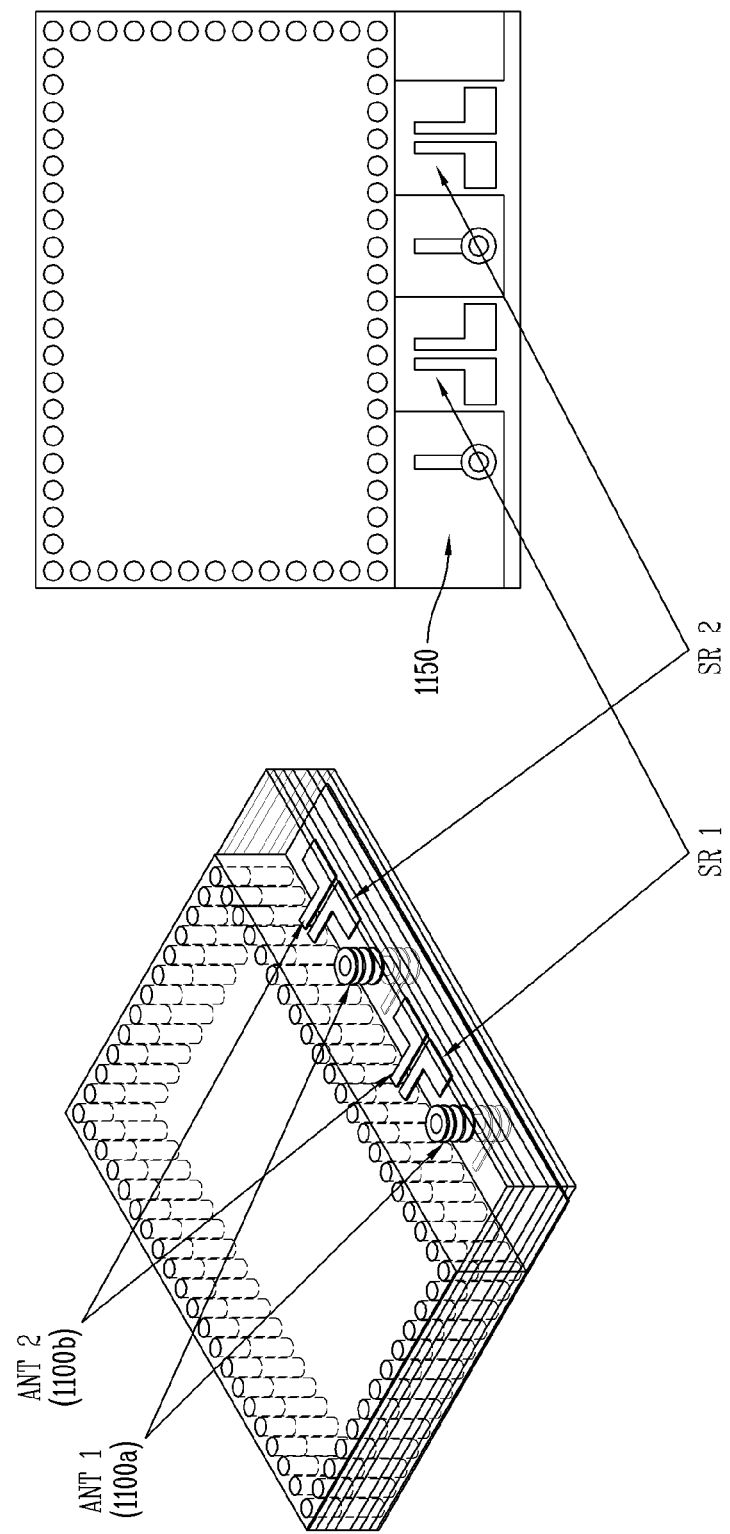
FIG. 8 illustrates an antenna module in which a portion of a ground area is removed according to an embodiment.

Referring to FIGS. 7B and 8, a slot region SR may be provided in a region of a ground pattern 1150, i.e., the ground layer disposed on a multi-layer substrate and provided with a dipole radiator R2 corresponding to a horizontal polarization antenna. Meanwhile, a plurality of slot regions SR1 and SR2 may be provided with respect to the second array antenna ANT2 1100b including a plurality of dipole radiators R2. Here, the term "slot" corresponding to the slot regions SR1 and SR2 may be referred to as a "slit" or "gap" according to an implementation type. That is, the slot regions SR1 and SR2 may be implemented in a form of a "slot", a "slit", or a "gap" provided that they are capable of reducing interference between radiator elements.

The slot regions SR1 and SR2 may be present regardless of the presence or absence of the dipole radiator R2. For example, when there is no dipole radiator, the slot regions SR1 and SR2 attenuate mutual coupling between the monopole radiators R1 in the first array antenna ANT1 1100*a* including the monopole radiators R1.

When the dipole radiator R1 is present, the slot regions SR1 and SR2 may also improve radiation performance of a dipole antenna. Accordingly, the performance of the first array antenna ANT1 1100*a* and the second array antenna ANT2 1100*b* may be improved by adjusting horizontal or vertical sizes of the slot regions SR1 and SR2. That is, the performance of the first array antenna ANT1 1100*a* including the monopole radiator R1 and the second array antenna ANT2 1100*b* including the dipole radiators R2 may be improved.

As described above, the first array antenna ANT1 1100*a* may include a plurality of radiators, i.e., the monopole radiators R1, which are spaced apart from each other by a certain distance in a width direction to perform beamforming. The slot regions SR1 and SR2 may be disposed in a ground region between the plurality of radiators R1 of the first array antenna ANT1 1100*a*.

The second array antenna ANT2 1100*b* may include a plurality of second radiators, i.e., the dipole radiators R2, which are spaced apart from each other by the certain distance in a width direction to perform beamforming. The second radiator R2 may be disposed in a region between the plurality of radiators R1 corresponding to the slot regions SR1 and SR2.

The dipole radiator R2 described herein may also be configured to increase a forward gain through a director element. In this regard, FIG. 9 is a front view illustrating an antenna module in which a monopole radiator to which a director is added and a dipole radiator to which a director is added are disposed according to an embodiment.

Figure 9:
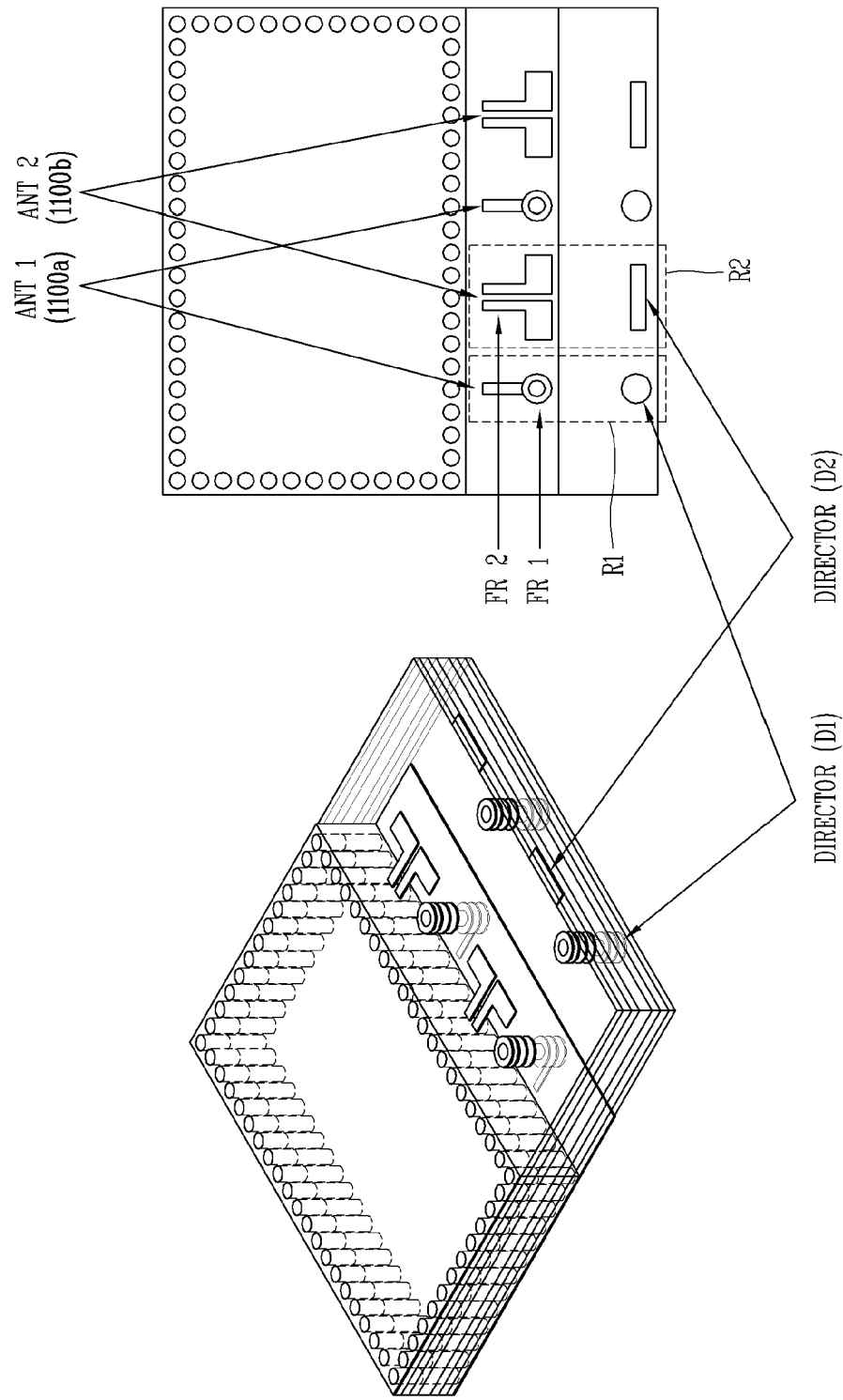
FIG. 9 is a front view illustrating an antenna module in which a monopole radiator to which a director is added and a dipole radiator to which a director is added are disposed according to an embodiment.

Referring to FIG. 9, a multi-layer substrate corresponding to an antenna module may include the first array antenna ANT1 1100*a* with a monopole radiator to which a director is added and the second array antenna ANT2 1100*b* having a dipole radiator to which a director is added.

The monopole radiator R1 may be configured to include the feeding radiator FR1 and the director D1. The feeding radiator FR1 and the director D1 may be spaced apart from each other in an axial direction, e.g., a longitudinal direction. The first array antenna ANT1 1100*a* may be configured by disposing monopole radiators R1 including the feeding radiator FR1 and the director D1 to be spaced apart from each other by a certain distance in another axial direction.

The director D1 may be disposed to be spaced apart from the feeding radiator FR1 by a certain distance in an axial direction without being connected to a feeding pattern for coupling of a field radiated from the monopole radiator R1.

The feeding radiator FR1 is configured by stacking metal patterns on different layers of a multi-layer substrate. The feeding radiator FR1 may be configured such that one of the metal patterns is connected to the feeding pattern 1120. The director D1 may be spaced a certain distance from the feeding radiator FR1 in a longitudinal direction and configured by stacking metal patterns on different layers of the multi-layer substrate.

Referring to FIGS. 6B and 9, the director D1 may be configured so that the metal patterns are connected to each other. In this regard, adjacent metal patterns of the director D1 may be configured to be connected to each other through a via. A metal pattern of the director D1 may also be provided on the lowermost portion of the multi-layer substrate. In contrast, metal patterns may not be provided on a lowermost portion of the multi-layer substrate, and the ground pattern GND_P may be provided on the lowermost portion of the multi-layer substrate. Therefore, a vertical length of the director D1 may be provided to be greater than that of the feeding radiator FR1.

The dipole radiator R2 may be provided to include a feeding radiator FR2 and a director D2. The feeding radiator FR2 and the director D2 may be spaced apart from each other in an axial direction, e.g., a longitudinal direction. The second array antenna ANT2 1100*b* may be configured by disposing dipole radiators R2 including the feeding radiator FR2 and the director D2 to be spaced apart from each other by a certain distance in another axial direction.

The director D2 may be disposed to be spaced apart from the feeding radiator FR2 by a certain distance in an axial direction without being connected to the feeding pattern 1120*b* for coupling of a field radiated from the dipole radiator R2.

The feeding radiator FR2 may be disposed in a form of a dipole antenna on one layer of the multi-layer substrate. The feeding radiator FR2 may also be disposed in the form of a dipole antenna stacked on different layers of the multi-layer substrate for bandwidth extension.

The director D2 may be spaced apart from the feeding radiator FR2 by a certain distance in a longitudinal direction and disposed in parallel with the feeding radiator FR2 on the same layer. However, the director D2 may not necessarily be disposed on the same layer as the feeding radiator FR2 and may be disposed on a different layer to optimize antenna characteristics.

When the feeding radiator FR2 is provided in a stacked form, the director D2 may also be provided in a stacked form. When the feeding radiator FR2 is provided in a stacked form, the director D2 may be stacked in parallel with the feeding radiator FR2 on the same layer. However, the director D2 may not necessarily be disposed on the same layer as the feeding radiator FR2 and may be disposed on a different layer to optimize antenna characteristics.

Referring to FIGS. 8 and 9, a first array antenna and a second array antenna having different polarizations have technical features described below.

1) In a case of a horizontal polarization antenna, the ground pattern 1150 may be partially removed by providing the slot regions SR1 and SR2 in a region of a ground at a lower end.
2) The coverage of the horizontal polarization antenna in a downward direction may be increased by partially removing a ground pattern at the lower end. In addition, a bandwidth of the horizontal polarization antenna may be increased by partially removing the ground pattern at the lower end.
3) Referring to FIG. 9, the first director D1 and the second director D2 may be added to the first array antenna ANT1 1100*a* and the second array antenna ANT2 1100*b* that have dual polarizations orthogonal to each other, respectively.

Figure 10:
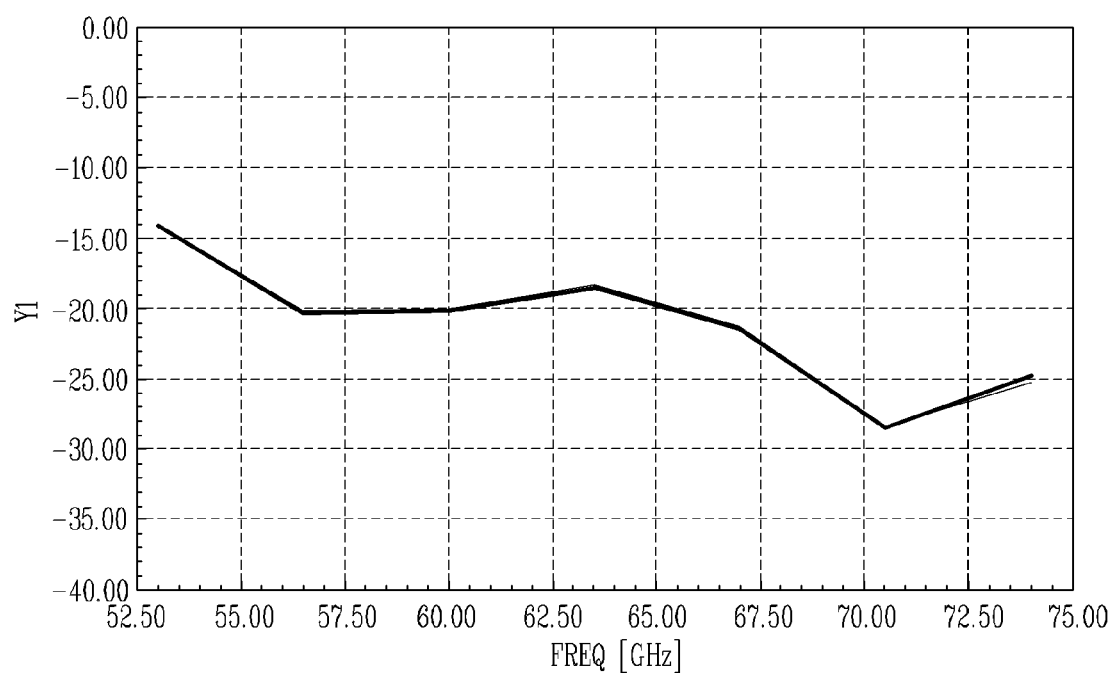
FIG. 10 illustrates reflection coefficient characteristics of an array antenna including a monopole/dipole radiator described herein.

A first array antenna and a second array antenna having different polarizations described herein have wideband characteristics and high antenna gain characteristics. In this regard, FIG. 10 illustrates reflection coefficient characteristics of an array antenna including a monopole/dipole radiator as described herein. Referring to FIGS. 9 and 10, both a first array antenna including a monopole radiator and a second array antenna including a dipole antenna have reflection loss characteristics of −10 dB or less in a band of 53 to 74 GHz. Therefore, both the first array antenna with the monopole radiator and the second array antenna with the dipole antenna operate in a broadband of 60 GHz. For example, the first array antenna and the second array antenna may be used as antennas operating in a band of IEEE 802.11 ay (57.2 to 70.2 GHz) in addition to a 6G communication service.

Figure 11A:
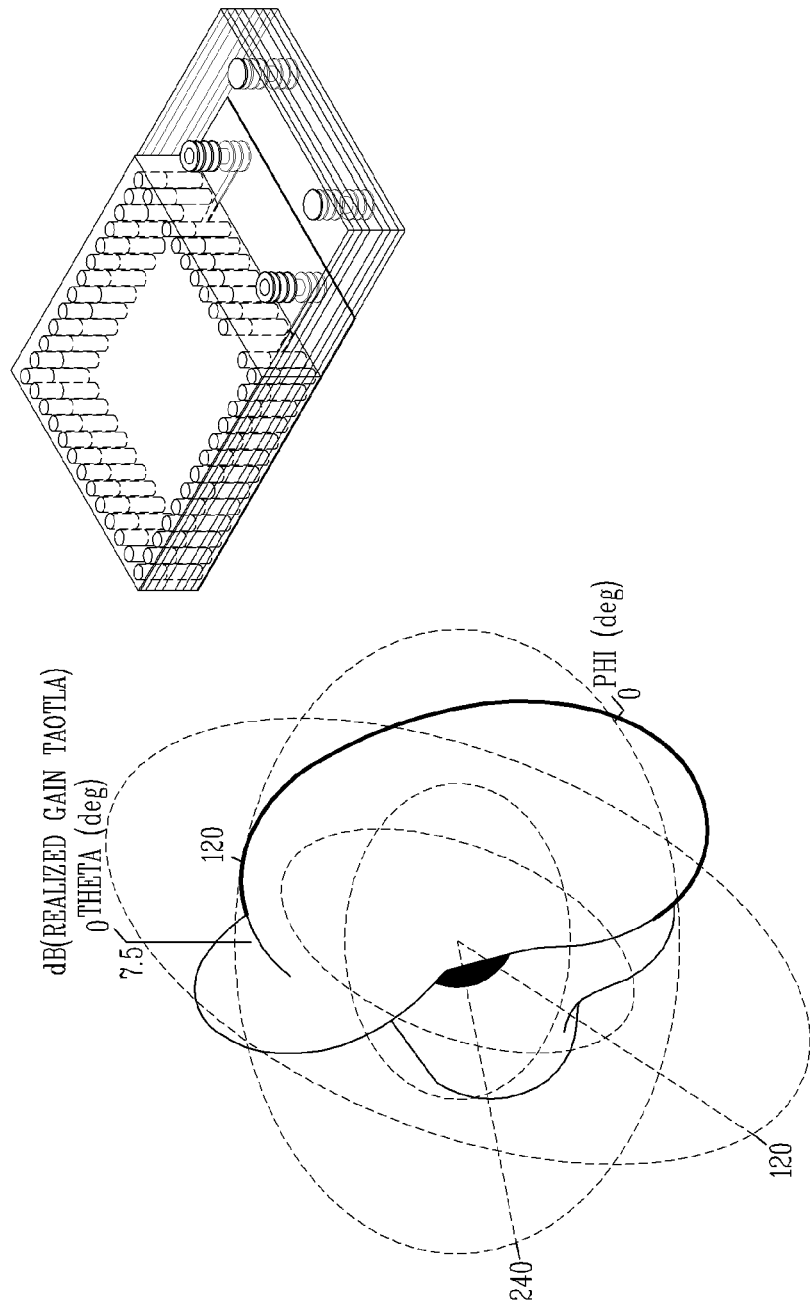
FIGS. 11A and 11B are diagrams for comparing a three-dimensional (3D) radiation pattern and a two-dimensional (2D) radiation pattern of a 1×2 array antenna with each other.
Figure 11B:
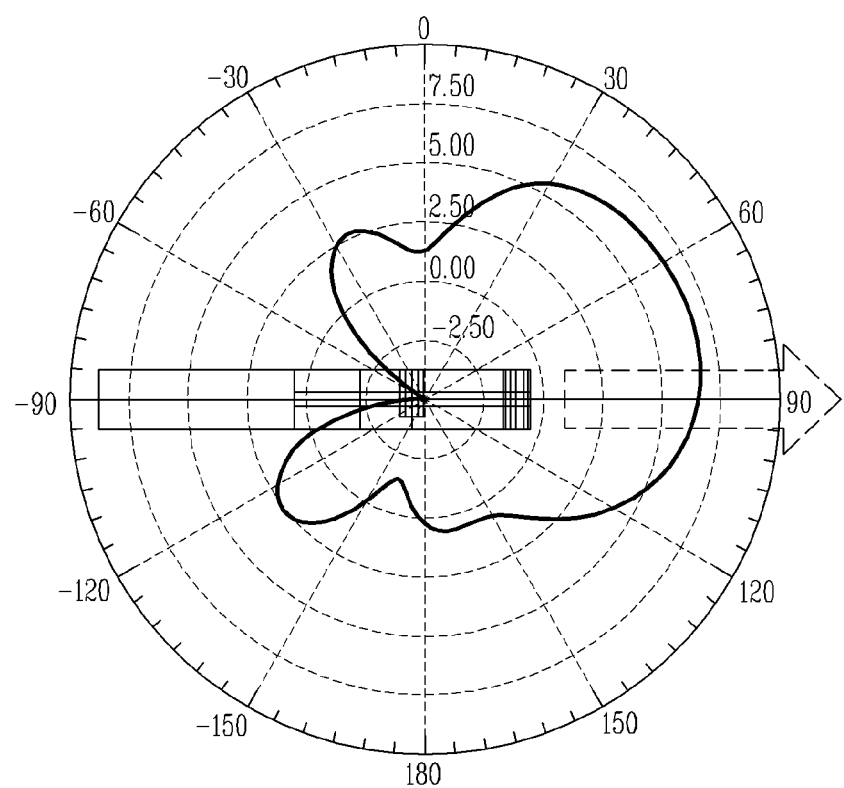

FIGS. 11A and 11B are diagrams for comparing a three-dimensional (3D) radiation pattern and a two-dimensional (2D) radiation pattern of a 1×2 array antenna with each other. Referring to FIG. 11A, it may be understood that a directional beam is provided in a direction in which an antenna is arranged in a 3D radiation pattern of a 1×2 array antenna. A peak gain of the 1×2 array antenna is high, e.g., about 6.7 dBi.

Referring to FIG. 11B, a radiation pattern of an antenna described herein has end-fire characteristics in which a beam is provided in a direction toward a front of an antenna. In this regard, the monopole radiator R1 and the dipole radiator R2 have end-fire characteristics in which a beam is provided in a direction toward a front of an antenna. Meanwhile, the monopole radiator R1 and the dipole radiator R2 may have vertical polarization characteristics and horizontal polarization characteristics, respectively, to implement MIMO.

A metal pattern of the monopole radiator R1 described herein may be provided in various forms to reduce an antenna size, as well as in a form of a via pad. In this regard, FIGS. 12A to 12C are a perspective view of an antenna including a monopole radiator Ra1 configured to have a form of a metal strip, and a perspective view and a front view of the monopole radiator Ra1.

Figure 13A:
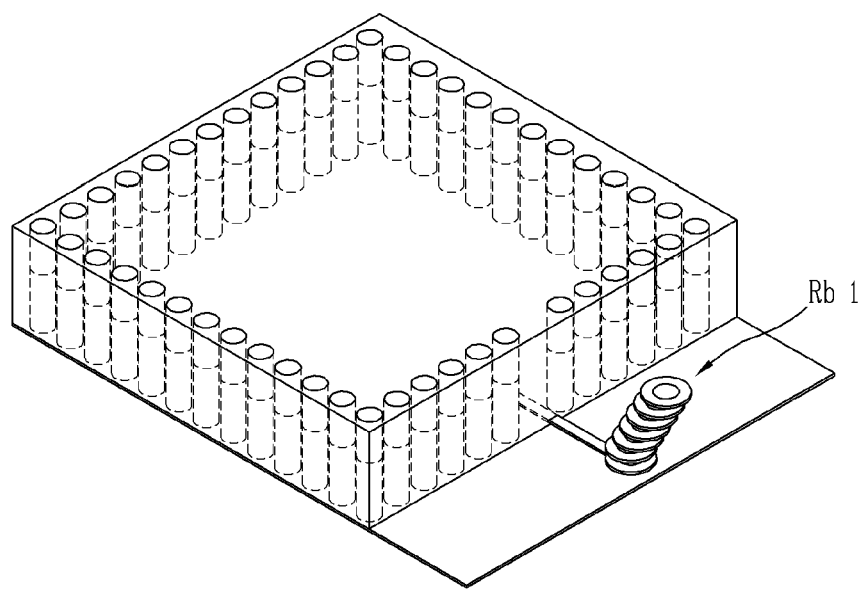
FIGS. 13A to 13C are a perspective view of an antenna including a monopole radiator (Rb1) configured to have a structure of an offset between metal patterns, and a perspective view and a front view of the monopole radiator (Rb1), respectively.
Figure 13B:
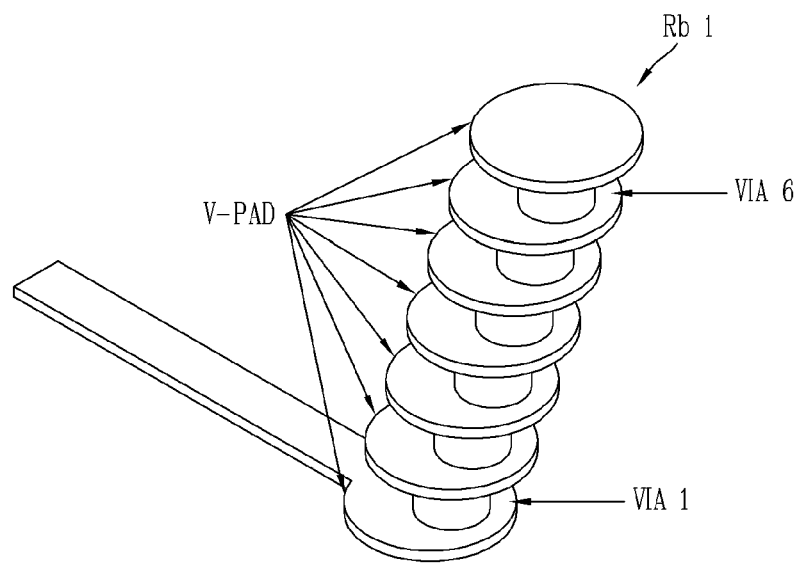
Figure 13C:
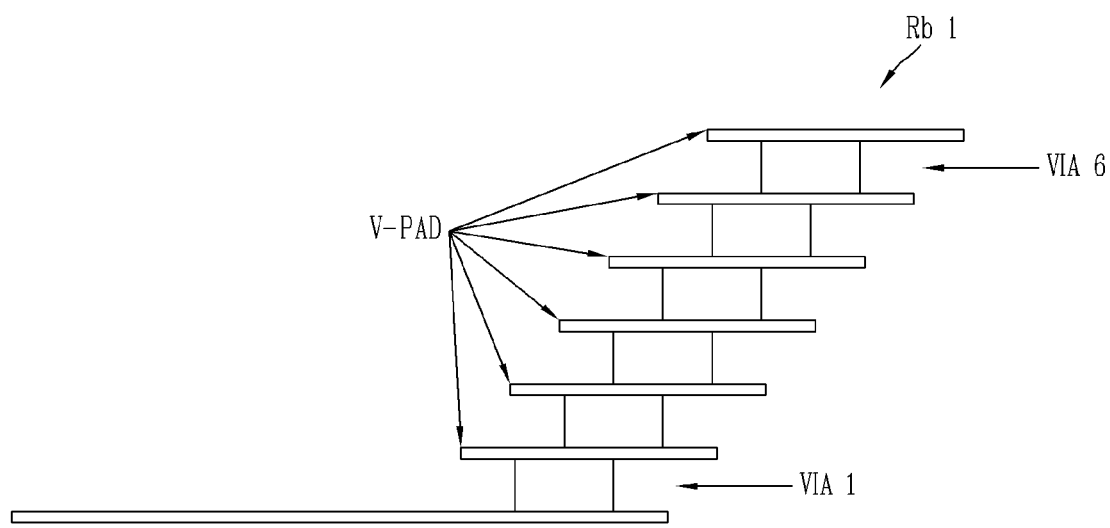

FIGS. 13A to 13C are a perspective view of an antenna including a monopole radiator Rb1 configured to have a structure of an offset between metal patterns, and a perspective view and a front view of the monopole radiator Rb1, respectively.

Figure 12A:
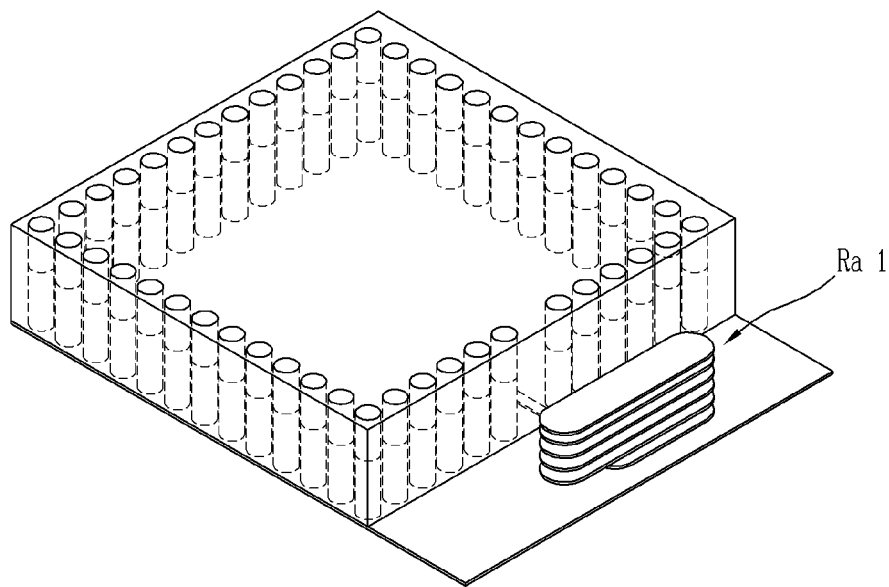
FIGS. 12A to 12C are a perspective view of an antenna including a monopole radiator (Ra1) configured to have a form of a metal strip, and a perspective view and a front view of the monopole radiator (Ra1).
Figure 12B:
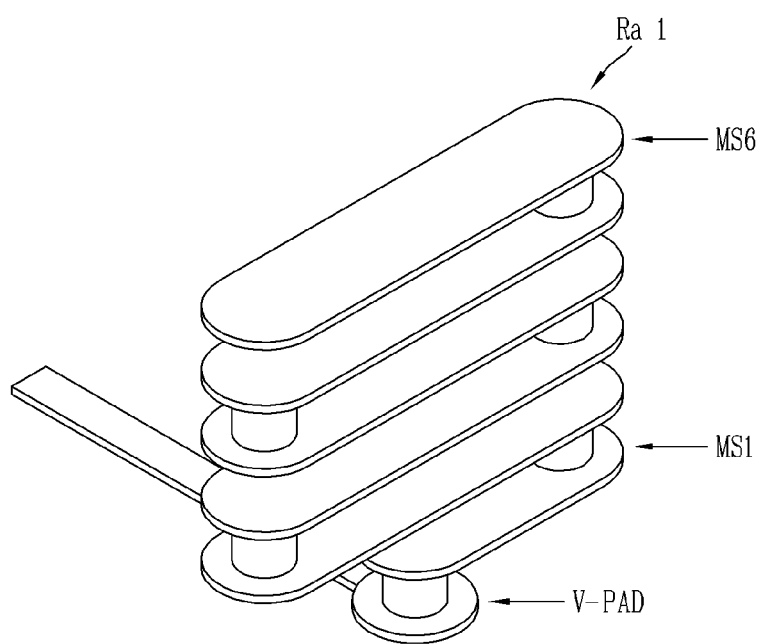
Figure 12C:
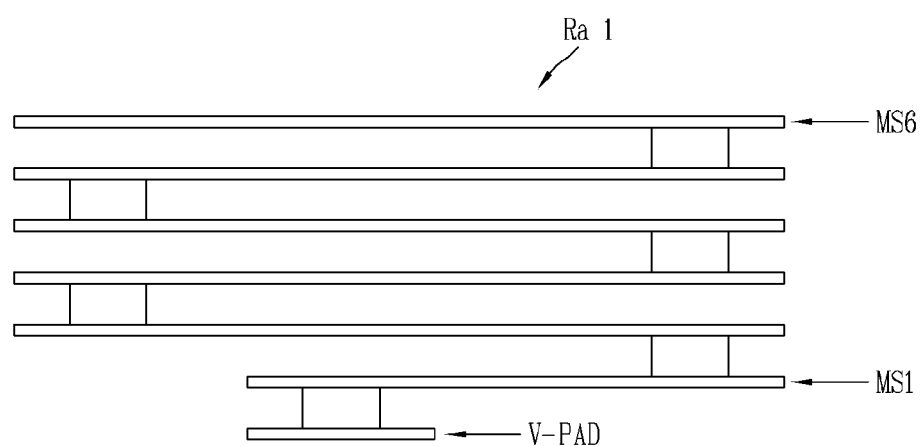

Referring to FIGS. 12A to 12C, the monopole radiator Ra1 may include a plurality of metal patterns on different layers of a multi-layer substrate. Here, the metal patterns may include a via pad V-PAD arranged at a lower end and a plurality of metal strips MS1 to MS6. A number of the plurality of metal strips MS1 to MS6 may be changed according to an application. In this regard, metal strips on adjacent layers among the plurality of metal strips MS1 to MS6 may be alternately connected to each other on different ends.

In relation to this, the monopole radiator Rb1 that increases in length due to the plurality of metal strips MS1 to MS6 may contribute to a reduction in a size of an antenna. The monopole radiator Ra1 that increases in length due to the plurality of metal strips MS1 to MS6 may operate as an antenna in a lower band. For example, when the monopole radiator R1 operates as an antenna in a band of 60 GHz, the monopole radiator Ra1 that increases in length may operate as an antenna in a band of 28 GHz or 38.5 GHz.

Referring to FIGS. 13A to 13C, the monopole radiator Rb1 may include a plurality of via pads V-PAD arranged on different layers of a multi-layer substrate to be offset by a certain distance. Here, the number of the plurality of via pads V-PAD arranged to be offset may be changed according to an application. In this regard, adjacent ones among the plurality of via pads V-PAD may be connected to each other by vias Via 1 to Via 6 arranged to be offset by a certain distance. Here, a number of the vias Via 1 to Via 6 arranged to be offset by the distance may be changed according to an application.

In this case, the monopole radiator Rb1 that increases in length due to the vias Via 1 to Via 6 that are offset to each other may contribute to a reduction in a size of an antenna. In addition, the monopole radiator Rb1 that increases in length due to the plurality of via pads V-PAD arranged to be offset to each other is capable of operating as an antenna in a lower band. For example, when the monopole radiator R1 in FIG. 9 operates as an antenna in a band of 60 GHz, the monopole radiator Rb1 that increases in length may operate as an antenna in a band of 28 GHz or 38.5 GHz.

A monopole antenna and a dipole antenna having vertical/horizontal polarization described herein have technical features described below.

1) The monopole antenna may be disposed inside a PCB, which is a multi-layered substrate, without extending to outer sides of the PCB.
2) The monopole antenna is disposed inside a PCB, which is a multi-layer substrate, and electrically connected to layers of the PCB through vias. To this end, via pads of the monopole antenna corresponding to the vias may be disposed on the layers.
3) A ground wall consisting of vias may be disposed on the PCB that is a multi-layer substrate to be spaced apart from a rear surface of an antenna by a certain distance to operate the monopole antenna as an end-fire antenna. The ground wall may operate as a reflector to improve an antenna gain.
4) When the monopole antenna radiates a signal, a ground surface of the monopole antenna may be partially removed to increase an antenna gain in an end-fire direction. In relation to this, a ground pattern corresponding to the ground surface may be provided in a minimum length to a degree to feed the monopole antenna using the feeding pattern. Accordingly, the ground pattern may be provided only in a minimum length, thereby improving an antenna gain in a forward direction.
5) A director element of the monopole antenna may be disposed at a point spaced apart from a front side of the monopole antenna by a particular distance. A vertical via electrically connected to the multi-layer substrate may be disposed on the director element. The director element may operate to be coupled to the monopole antenna, thereby improving an antenna gain.
6) A feeding line may include a micro strip line, a CPW, a CPWG, or a strip line.
7) Array antennas with different polarizations may be arranged in a horizontal direction. Accordingly, different array antennas with vertical/horizontal polarization may be disposed in a low-profile form in an antenna module.

A MIMO operation may be performed using array antennas with vertical/horizontal polarization described herein. The array antennas with vertical/horizontal polarization may be disposed at different positions on an electronic device. In this case, examples of the electronic device may include a fixed terminal, a television, a display device, etc. in addition to a mobile terminal.

Figure 14:
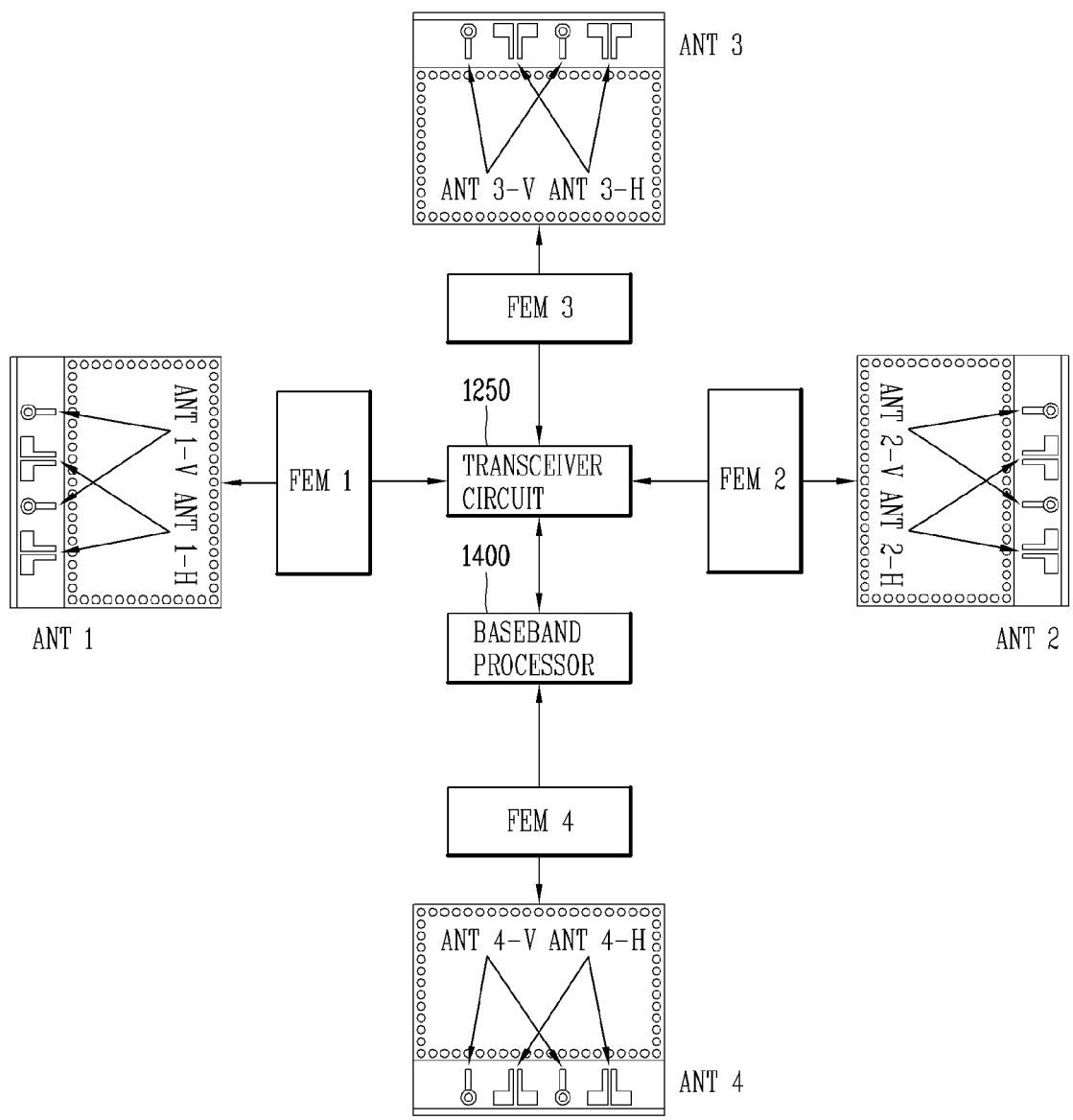
FIG. 14 illustrates an electronic device with a plurality of array antennas according to an embodiment.

FIG. 14 illustrates an electronic device including a plurality of array antennas according to an embodiment. Referring to FIG. 4A to 14, an antenna element including a first radiator R1 and a second radiator R2 may constitute an array antenna. According to an embodiment, a plurality of antenna modules may be disposed in the electronic device to implement MIMO.

A plurality of array antennas may include first to fourth antennas ANT1 to ANT4. In this case, the first to fourth antennas ANT1 to ANT4 may be disposed on a left side, a right side, an upper side, and a lower side of the electronic device. However, positions at which the first to fourth antennas ANT1 to ANT4 are disposed are not limited thereto and may be changed according to an application.

Each of the first to fourth antennas ANT1 to ANT4 may be provided to include a horizontal polarization antenna and a vertical polarization antenna. For example, the first antenna ANT1 may include a first horizontal polarization antenna ANT1-H and a first vertical polarization antenna ANT1-V. The second antenna ANT2 may include a second horizontal polarization antenna ANT2-H and a second vertical polarization antenna ANT2-V. The third antenna ANT3 may include a third horizontal polarization antenna ANT3-H and a third vertical polarization antenna ANT3-V. The fourth antenna ANT4 may include a fourth horizontal polarization antenna ANT4-H and a fourth vertical polarization antenna ANT4-V.

Different antennas with polarizations orthogonal to each other may be provided in one antenna module to double a number of MIMO streams. The electronic device may implement up to rank-8 MIMO using the first horizontal polarization antenna ANT1-H to the fourth horizontal polarization antenna ANT4-H and the first vertical polarization antenna ANT1-V to the fourth vertical polarization antenna ANT4-V. The electronic device may implement up to 8TxUL-MIMO using the first horizontal polarization antenna ANT1-H to the fourth horizontal polarization antenna ANT4-H and the first vertical polarization antenna ANT1-V to the fourth vertical polarization antenna ANT4-V. The electronic device may implement up to 8RxDL-MIMO using the first horizontal polarization antenna ANT1-H to the fourth horizontal polarization antenna ANT4-H and the first vertical polarization antenna ANT1-V to the fourth vertical polarization antenna ANT4-V.

Alternatively, signal quality deterioration due to rotation of the electronic device may be prevented through different antennas included in one antenna module and having polarizations orthogonal to each other. In this case, the first antenna ANT1 may transmit and/or receive a signal simultaneously through the first horizontal polarization antenna ANT1-H and the first vertical polarization antenna ANT1-V. Accordingly, even when the quality of a signal received through one antenna deteriorates due to rotation of the electronic device, the signal may be received through another antenna. Similarly, the fourth antenna ANT4 may transmit and/or receive a signal simultaneously through the fourth horizontal polarization antenna ANT4-H and the fourth vertical polarization antenna ANT4-V. Accordingly, even when the quality of a signal received through one antenna deteriorates due to the rotation of the electronic device, the signal may be received through another antenna.

The first to fourth antennas ANT1 to ANT4 may be operably coupled to a first front end module FEM1 to a fourth front end module FEM4, respectively. In this case, each of the first to fourth front end modules FEM1 to FEM4 may include a phase controller, a power amplifier, and a reception amplifier. Each of the first to fourth front end modules FEM1 to FEM4 may include some elements of a transceiver circuit 1250 corresponding to a radio-frequency integrated circuit (RFIC).

A processor 1400 may be operably coupled to the first to fourth front end modules FEM1 to FEM4. The processor 1400 may include some elements of the transceiver circuit 1250 corresponding to the RFIC. The processor 1400 may include a baseband processor 1400 corresponding to a modem. The processor 1400 may be provided in a form of a system-on-chip (SoC) including some elements of the transceiver circuit 1250 corresponding to the RFIC and the baseband processor 1400 corresponding to the modem. However, the configuration of the processor 1400 is not limited to that shown in FIG. 12 and may be variously changed according to an application.

The processor 1400 may control the first to fourth front end modules FEM1 to FEM 4 to radiate a signal through at least one of the first to fourth antennas ANT1 to ANT4. In this case, an optimal antenna may be selected on the basis of quality of signals received through the first to fourth antennas ANT1 to ANT4.

The processor 1400 may control the first to fourth front end modules FEM1 to FEM 4 to implement MIMO through at least two of the first to fourth antennas ANT1 to ANT4. In this case, an optimal combination of antennas may be selected on the basis of quality of signals received through the first to fourth antennas ANT1 to ANT4 and a level of interference.

The processor 1400 may control the first to fourth front end modules FEM1 to FEM 4 to perform carrier aggregation (CA) through at least one of the first to fourth antennas ANT1 to ANT4. In this case, because each of the first to fourth antennas ANT1 to ANT4 resonates in a first band and a second band, CA may be performed through one array antenna.

The processor 1400 may determine signal quality in the first band and the second band for each antenna. The processor 1400 may perform CA through one antenna in the first band and another antenna in the second band on the basis of quality of signals in the first band and the second band.

Various changes and modifications to the above-described embodiments related to an array antenna operating in a millimeter wave band and an electronic device for controlling the array antenna will be clearly understood by those of ordinary skill in the art within the spirit and scope of the present disclosure. Therefore, it should be understood that such various changes and modifications to the implementations fall within the scope of the appended claims.

An electronic device described herein may simultaneously transmit information to or receive information from various entities such as a peripheral electronic device, an external device, or a base station. Referring to FIGS. 1 to 14, the electronic device may perform MIMO through the antenna module 1100, the transceiver circuit 1250 configured to control the antenna module 1100, and the baseband processor 1400. Communication capacity and/or reliability of information transmission and reception may be improved by performing MIMO. Accordingly, the electronic device can transmit or receive different information to or from various entities at the same time to improve a communication capacity. This can improve the communication capacity of the electronic device through the MIMO without a bandwidth extension.

Alternatively, the electronic device may simultaneously receive the same information from various entities, so as to improve reliability for surrounding information and reduce latency. Accordingly, ultra-reliable low latency communication (URLLC) may be performed in the electronic device and the electronic device can operate as a URLLC UE. To this end, a base station performing scheduling may preferentially allocate a time slot for the electronic device operating as the URLLC UE. For this, some of specific time-frequency resources already allocated to other UEs may be punctured.

As described above, the plurality of array antennas ANT1 to ANT4 may operate in a broadband, e.g., a first frequency band of 28 GHz and a second frequency band of 38.5 GHz. The baseband processor 1400 may perform MIMO in the first band through some of a plurality of antenna elements including the array antennas ANT1 to ANT4. Also, the baseband processor 1400 can perform MIMO through some of the plurality of antenna elements ANT1 to ANT4 in the second frequency band. In this case, MIMO may be performed using array antennas arranged spaced apart from each other by a sufficient distance and rotated by a certain angle. Accordingly, a degree of isolation between a first signal and a second signal in the same band may be improved.

At least one of the first to fourth antennas ANT1 to ANT4 in the electronic device may operate as a radiator in the first frequency band. Meanwhile, at least one of the first to fourth antennas ANT1 to ANT4 may operate as a radiator in the second frequency band.

According to an embodiment, the baseband processor 1400 may perform MIMO in the first frequency band through two or more array antennas among the first to fourth antennas ANT1 to ANT4. The baseband processor 1400 may perform MIMO in the second frequency band through two or more array antennas among the first to fourth antennas ANT1 to ANT4.

In this regard, the baseband processor 1400 may transmit a request to provide time/frequency resources of the second frequency band to a base station when both qualities of signals from two or more array antennas in the first frequency band are equal to or less than a threshold. Accordingly, when the time/frequency resources of the second frequency band are allocated, the baseband processor 1400 may perform MIMO using the resources through two or more array antennas among the first to fourth array antennas ANT1 to ANT4.

Even when the resources of the second frequency band are allocated, MIMO may be performed using the two or more same array antennas. Accordingly, it is possible to prevent power consumption caused when a corresponding front end module (FEM) is turned on/off due to a change of array antennas. In addition, performance degradation due to a settling time of an electronic component, e.g., an amplifier, caused when the corresponding FEM is turned on/off due to a change of array antennas may be prevented.

Meanwhile, when the resources of the second frequency band are allocated, at least one of the two or more array antennas may be changed and MIMO may be performed through the corresponding array antennas. Therefore, when it is determined that propagation environments of the first and second frequency bands are different from each other and it is difficult to perform communication through a corresponding array antenna, another array antenna may be used.

According to another embodiment, the baseband processor 1400 may control the transceiver circuit 1250 to receive a second signal of the second band while receiving a first signal of the first band through one of the first to fourth antennas ANT1 to ANT4. In this case, the baseband processor 1400 can advantageously perform carrier aggregation (CA) through one antenna.

Accordingly, the baseband processor 1400 may perform CA through a band that is a combination of the first and second frequency bands. Accordingly, the present disclosure is advantageous in that when a large amount of data needs to be transmitted or received by an electronic device, the large amount of data may be transmitted or received in a broadband through CA.

Accordingly, the electronic device is capable of performing enhanced mobile broad band (eMBB) communication and may operate as an eMBB UE. To this end, a base station for performing scheduling may allocate wideband frequency resources for the electronic device operating as an eMBB UE. For this purpose, CA may be performed on extra frequency bands except for frequency resources already allocated to other UEs.

Various changes and modifications to the above-described embodiments related to an array antenna operating in a millimeter wave band and an electronic device for controlling the array antenna will be clearly understood by those of ordinary skill in the art within the spirit and scope of the present disclosure. Therefore, it should be understood that such various changes and modifications to the implementations fall within the scope of the appended claims.

An array antenna that operates in a millimeter wave band and an electronic device for controlling the same according to the present disclosure have been described above. A wireless communication system that includes an array antenna operating in a millimeter wave band, an electronic device for controlling the array antenna, and a base station will be described below. In this regard, FIG. 15 is an exemplary block diagram of a wireless communication system to which methods proposed herein are applicable.

Figure 15:
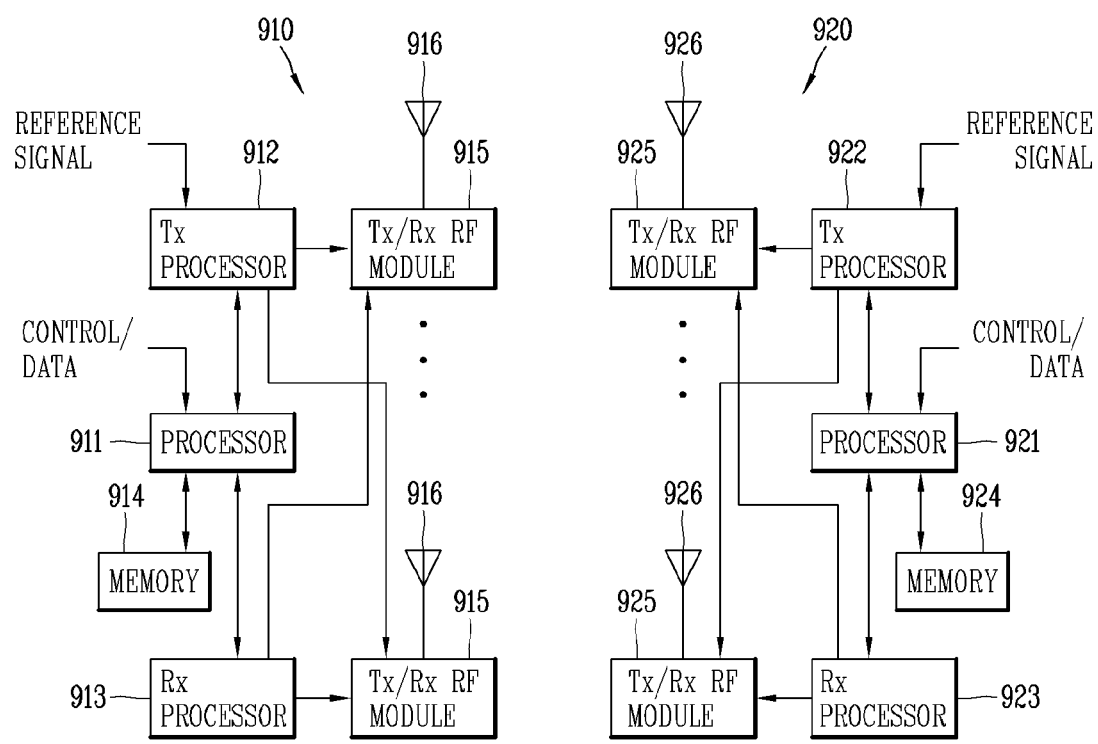
FIG. 15 is an exemplary block diagram of a wireless communication system to which methods proposed in the present disclosure are applicable.

Referring to FIG. 15, the wireless communication system includes a first communication device 910 and/or a second communication device 920. The term 'A and/or B' may be interpreted as having the same meaning as 'including at least one of A or B'. The first communication device may denote a base station and the second communication device may denote a terminal (or the first communication device may denote the terminal or the vehicle and the second communication device may denote the base station).

The base station (BS) may be replaced with a term such as a fixed station, a Node B, an evolved-NodeB (eNB), a next generation NodeB (gNB), a base transceiver system (BTS), an access point (AP), or a general NB (gNB), a 5G system, a network, an AI system, a road side unit (RSU), robot or the like. In addition, the terminal may be fixed or have mobility, and may be replaced with a term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot, an AI module, or the like.

The first communication device and the second communication device each may include a processor 911, 921, a memory 914, 924, one or more Tx/Rx radio frequency modules 915, 925, a Tx processor 912, 922, an Rx processor 913, 923, and an antenna 916, 926. The processor may implement the aforementioned functions, processes, and/or methods. More specifically, in DL (communication from the first communication device to the second communication device), an upper layer packet from a core network may be provided to the processor 911. The processor may implement the function of an L2 layer. In DL, the processor may provide multiplexing between a logical channel and a transport channel and radio resource allocation to the second communication device 920, and may be responsible for signaling to the second communication device. The Tx processor 912 may implement various signal processing functions for an L1 layer (i.e., a physical layer). The signal processing function may facilitate forward error correction (FEC) in the second communication device, and include coding and interleaving. Encoded and modulated symbols may be divided into parallel streams. Each stream may be mapped to an OFDM subcarrier, multiplexed with a reference signal (RS) in a time and/or frequency domain, and combined together using an Inverse Fast Fourier Transform (IFFT) to create a physical channel carrying a time-domain OFDMA symbol stream. The OFDM stream may be spatially precoded to generate multiple spatial streams. Each spatial stream may be provided to the different antenna 916 via the separate Tx/Rx module (or transceiver) 915. Each Tx/Rx module may modulate an RF carrier into a spatial stream for transmission. The second communication device may receive a signal through the antenna 926 of each Tx/Rx module (or transceiver) 925. Each Tx/Rx module may recover information modulated to the RF carrier, and provide it to the RX processor 923. The RX processor may implement various signal processing functions of the layer 1. The RX processor may perform spatial processing with respect to information to recover an arbitrary spatial stream destined for the second communication device. If multiple spatial streams are destined for the second communication device, they may be combined into a single OFDMA symbol stream by plural RX processors. The RX processor may transform the OFDMA symbol stream from a time domain to a frequency domain by using Fast Fourier Transform (FFT). A frequency domain signal may include an individual OFDMA symbol stream for each subcarrier of the OFDM signal. Symbols on each subcarrier and a reference signal may be recovered and demodulated by determining the most probable signal placement points transmitted by the first communication device. These soft decisions may be based on channel estimate values. The soft decisions may be decoded and deinterleaved to recover data and control signal originally transmitted by the first communication device on the physical channel. The corresponding data and control signal may then be provided to the processor 921.

UL (communication from the second communication device to the first communication device) may be processed in the first communication device 910 in a manner similar to that described with respect to the receiver function in the second communication device 920. Each Tx/Rx module 925 may receive a signal via the antenna 926. Each Tx/Rx module may provide the RF carrier and information to the RX processor 923. The processor 921 may be associated with the memory 924 that stores program code and data. The memory may be referred to as a computer-readable medium.

An array antenna that operates in a millimeter wave band and an electronic device for controlling the same have been described above. Technical effects of an array antenna that operates in a millimeter wave band and an electronic device that control the same will be described below.

According to an embodiment, an electronic device including an antenna module having an array antenna operating in a millimeter wave band and a transceiver circuit for control of the antenna module and a modem may be provided.

According to an embodiment, an antenna module having antenna elements with different polarizations orthogonal to each other in a millimeter wave band may be provided by disposing a monopole antenna and a dipole antenna in the antenna module.

According to an embodiment, a vertical polarization antenna may be provided in an antenna monopole having a certain height through a monopole antenna implemented with a via pad and via.

According to an embodiment, an antenna structure for implementing vertical polarization while reducing a height by offsetting a via pad and a via by a certain distance or through a combination of a metal strip and a via may be provided.

According to an embodiment, a level of interference between antennas with different polarizations may be reduced by alternately arranging a monopole antenna and a dipole antenna with different polarizations vertically and horizontally in an antenna module.

According to an embodiment, communication coverage in a millimeter wave band may be improved by increasing an end-fire antenna gain.

According to an embodiment, an end-fire antenna may be implemented as a double polarization array antenna to increase the number of multi-input multi-output (MIMO) streams, thereby improving communication capacity and reliability.

According to an embodiment, MIMO may be implemented using only one antenna module through antennas with polarizations orthogonal to each other.

Further scope of applicability of the present disclosure will become apparent from the following detailed description. It should be understood, however, that the detailed description and specific examples, such as the preferred embodiment of the present disclosure, are given by way of illustration only, since various changes and modifications within the spirit and scope of the present disclosure will be apparent to those skilled in the art.

In relation to the aforementioned disclosure, design and operations of an array antenna operating in a mmWave band and an electronic device controlling the same may be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. An electronic device with an antenna, the electronic device comprising:
   a plurality of radiator configured by stacking metal patterns on different layers of a multi-layer substrate and to radiate signal a vertical polarization signal, wherein at least some of the metal patterns are vertically connected to each other and one of the metal patterns is connected to a feeding pattern;
   a plurality of second radiator disposed a region among plurality of radiators on a layer of the multi-layer substrate and configured to radiate signal a horizontal polarization signal;
   a ground layer disposed on a lower layer of different feeding pattern of the multi-layer substrate and operating as a ground for the radiator; and
   a ground wall disposed on a rear surface of the plurality of radiator and configured to form a radiation pattern of the plurality of radiator in a direction toward a front of the multi-layer substrate.

2. The electronic device of claim 1, wherein the radiator operates as a monopole antenna due to a ground pattern located below the feeding pattern and the ground layer operating as the ground wall.

3. The electronic device of claim 2, wherein the ground wall comprises a plurality of via holes configured to connect different ground planes on different layers of the multi-layer substrate to each other,
wherein the plurality of via holes are provided in an edge of the multi-layer substrate to be spaced apart from each other by a certain distance.

4. The electronic device of claim 1, wherein the plurality of radiator forms a first array antenna spaced apart from each other by a certain distance in a width direction to perform beamforming,
wherein the plurality of second radiator forms a second array antenna spaced apart from each other by a certain distance in a width direction to perform beamforming,
wherein a slot region is provided in a ground region between the plurality of radiators of the first array antenna, the slot region corresponds to a region on which the second array antenna is disposed to decrease mutual coupling between the plurality of radiator and to improve radiation performance of the plurality of second radiator.

5. The electronic device of claim 4, further comprising:
a transceiver circuit operably coupled to one of the first array antenna and the second array antenna, and configured to control the first array antenna and the second array antenna,
wherein the plurality of second radiators are disposed in regions between the plurality of radiators corresponding to the slot region, respectively, and the plurality of radiators and the plurality of second radiators have polarization characteristics orthogonal to each other.

6. The electronic device of claim 5, wherein a metal pattern at a lower end, among the metal patterns of the plurality of radiators, is connected to the feeding pattern,
a ground pattern is disposed below the metal pattern at the lower end, and
an end of the ground pattern extends in a longitudinal direction, compared to an end of the metal pattern at the lower end.

7. The electronic device of claim 5, wherein the plurality of second radiators are disposed in a form of a dipole antenna on one layer of the multi-layer substrate and is connected to the transceiver circuit through a second feeding pattern.

8. The electronic device of claim 5, wherein the plurality of radiators comprise:
a feeding radiator configured by stacking metal patterns on different layers of the multi-layer substrate, wherein one of the metal patterns is connected to the feeding pattern; and
a director spaced apart from the feeding radiator by a certain distance in a longitudinal direction and configured by stacking metal patterns on different layers of the multi-layer substrate.

9. The electronic device of claim 8, wherein the director is configured by connecting the metal patterns to each other, and the metal patterns of the director are also provided on a lowermost portion of the multi-layer substrate.

10. The electronic device of claim 5, wherein the plurality of second radiators comprise:
a feeding radiator disposed in a form of a dipole antenna on one layer of the multi-layer substrate; and
a director spaced apart from the feeding radiator by a certain distance in a longitudinal direction to be parallel with the feeding radiator.

11. The electronic device of claim 1, wherein the radiator comprises a plurality of metal patterns disposed on the different layers of the multi-layer substrate,
wherein the plurality of metal patterns comprise a via pad disposed at a lower end of the radiator and a plurality of metal strips.

12. The electronic device of claim 11, wherein metal strips on adjacent layers among the plurality of metal strips are alternately connected to each other on different ends.

13. The electronic device of claim 1, wherein the radiator comprises a plurality of via pads disposed on each of different layers of the multi-layer substrate to be offset by a certain distance,
wherein adjacent via pads among the plurality of via pads are connected to each other through vias disposed to be offset by a certain distance, respectively.

14. The electronic device of claim 1, wherein a metal pattern at a lower end, among the metal patterns, is connected to a ground pattern, and
a metal pattern arranged over the metal pattern at the lower end connected to the ground pattern is connected to the feeding pattern.

15. The electronic device of claim 5, further comprising a baseband processor operably coupled to the transceiver circuit and configured to control the transceiver circuit,
wherein the baseband processor is configured to control the transceiver circuit to perform multiple-input multiple-output (MIMO) through the first array antenna and the second array antenna.

16. The electronic device of claim 15, wherein the baseband processor is configured to control the transceiver circuit to radiate a vertical polarization signal through the first array antenna and radiate a horizontal polarization signal through the second array antenna.

* * * * *